US011645600B2

(12) United States Patent
Daley et al.

(10) Patent No.: US 11,645,600 B2
(45) Date of Patent: May 9, 2023

(54) MANAGING APPAREL TO FACILITATE COMPLIANCE

(71) Applicant: International Business Machines Corporation, Armonk, NY (US)

(72) Inventors: Stan Kevin Daley, Atlanta, GA (US); Michael Bender, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 16/852,623

(22) Filed: Apr. 20, 2020

(65) Prior Publication Data

US 2021/0326901 A1    Oct. 21, 2021

(51) Int. Cl.
*G06Q 10/0635* (2023.01)
*G06Q 30/018* (2023.01)
(Continued)

(52) U.S. Cl.
CPC ......... *G06Q 10/0635* (2013.01); *G06F 18/22* (2023.01); *G06F 40/40* (2020.01);
(Continued)

(58) Field of Classification Search
CPC ........... G06Q 30/0185; G06Q 10/0635; G06Q 10/0875; G06Q 10/1093; G06Q 50/265;
(Continued)

(56) References Cited

U.S. PATENT DOCUMENTS 5,164,707 A    11/1992  Rasmussen
6,559,774 B2   5/2003   Bergan
(Continued)

FOREIGN PATENT DOCUMENTS

CN    108319934 A  *  7/2018
KR    1012155491 B1    12/2012
(Continued)

OTHER PUBLICATIONS

Nipun D. Nath "Deep learning for site safety: Real-time detection of personal protective equipment" Automation in Construction 112 (2020) 103085, Zachry Depanment of Civil Engineering, Texas A&M University, 3136 TAMU, College Station, TX 77843, USA (2020) (Year: 2020).*

(Continued)

*Primary Examiner* — Abdallah A El-Hage Hassan
(74) *Attorney, Agent, or Firm* — Richard B. Thomas

(57) ABSTRACT

Embodiments relate to a system, program product, and method for managing apparel to facilitate compliance through a cognitive system, i.e., using an artificial intelligence (AI) platform to dynamically analyze the apparel donned by individuals to determine compliance with established apparel compliance practices and provide suggestions for overcoming non-compliance. The determinations of non-compliance are accompanied with respective risk factors. The system, program product, and method disclosed herein facilitate leveraging written requirements processed by natural language processing (NLP) for the donning of apparel that includes proper clothing articles and accessories, as well as associated requirements of clothing articles and accessories that are not appropriate for the respective conditions.

20 Claims, 13 Drawing Sheets

(51) Int. Cl.

| | |
|---|---|
| *G06Q 50/26* | (2012.01) |
| *G06Q 10/0875* | (2023.01) |
| *G06N 20/00* | (2019.01) |
| *G06N 5/04* | (2023.01) |
| *G06F 40/40* | (2020.01) |
| *H04N 7/18* | (2006.01) |
| *G06Q 10/1093* | (2023.01) |
| *G06F 18/22* | (2023.01) |
| *G06V 10/764* | (2022.01) |
| *G06V 10/82* | (2022.01) |

(52) U.S. Cl.
CPC .............. *G06N 5/04* (2013.01); *G06N 20/00* (2019.01); *G06Q 10/0875* (2013.01); *G06Q 10/1093* (2013.01); *G06Q 30/0185* (2013.01); *G06Q 50/265* (2013.01); *G06V 10/764* (2022.01); *G06V 10/82* (2022.01); *H04N 7/181* (2013.01)

(58) Field of Classification Search
CPC .......... G06N 20/00; G06N 5/04; G06F 40/40; G06K 9/6201; H04N 7/181
USPC ....................................................... 705/7.28
See application file for complete search history.

(56) References Cited

U.S. PATENT DOCUMENTS

| | | | | |
|---|---|---|---|---|
| 9,695,981 | B2* | 7/2017 | Au | G06V 20/52 |
| 2006/0251339 | A1* | 11/2006 | Gokturk | G06V 40/107 |
| | | | | 707/E17.022 |
| 2016/0148132 | A1* | 5/2016 | Aqlan | G06Q 10/0635 |
| | | | | 705/7.16 |
| 2016/0232758 | A1 | 8/2016 | Fletcher | |
| 2017/0091698 | A1 | 3/2017 | Holler | |
| 2017/0181703 | A1* | 6/2017 | Kaib | A61B 5/25 |
| 2017/0206534 | A1* | 7/2017 | O'Brien | A41D 1/002 |
| 2018/0012470 | A1 | 1/2018 | Kritzler | |
| 2018/0082032 | A1* | 3/2018 | Allen | G16H 40/63 |
| 2018/0211345 | A1 | 7/2018 | Bean | |
| 2019/0163533 | A1* | 5/2019 | Andrews | G06F 9/5066 |
| 2019/0188773 | A1* | 6/2019 | Chu | G06F 16/5866 |
| 2019/0318364 | A1* | 10/2019 | Marascu | G06Q 30/018 |
| 2019/0343429 | A1* | 11/2019 | Elhawary | A61B 5/6823 |
| 2021/0117933 | A1* | 4/2021 | Lobner | |

FOREIGN PATENT DOCUMENTS

| | | | |
|---|---|---|---|
| WO | WO2019211691 | * | 4/2019 |
| WO | 2019211691 A1 | | 11/2019 |

OTHER PUBLICATIONS

Anonymous, "Method and System for Recommending Outfits to a User using a Smart Wardrobe," IP.com Disclosure No. IPCOM000241821D, Jun. 2, 2015, 4 pages. <https://ip.com/IPCOM/000241821>.
Mell et al., "The NIST Definition of Cloud Computing," Recommendations of the National Institute of Standards and Technology, U.S. Department of Commerce, Special Publication 800-145, Sep. 2011, 7 pages.
Wu et al., "Automatic detection of hardhats worn by construction personnel: A deep learning approach and benchmark dataset," Automation in Construction, vol. 106, Oct. 2019, 102894, 7 pages.
Zhang et al., "Real-Time Alarming, Monitoring, and Locating for Non-Hard-Hat Use in Construction." J. Construction Engineering and Management, vol. 145(3): 04019006, Mar. 2019, 13 pages.

* cited by examiner

MANAGING APPAREL TO FACILITATE COMPLIANCE

BACKGROUND

The present disclosure relates to cognitive systems and the management of apparel to facilitate compliance, and, more specifically, for leveraging an artificial intelligence platform to dynamically analyze the apparel donned by an individual to determine compliance with established apparel compliance practices and provide suggestions for overcoming non-compliance.

Many industries have written requirements for the donning of apparel that includes proper clothing articles and accessories, as well as associated requirements of clothing articles and accessories that are not appropriate for the respective conditions.

SUMMARY

A system, computer program product, and method are provided for managing apparel through leveraging a cognitive system, i.e., an artificial intelligence platform to dynamically analyze the apparel donned by an individual to determine compliance with established apparel compliance practices and provide suggestions for overcoming non-compliance.

In one aspect, a computer system is provided to manage apparel through dynamic analysis of apparel donned by an individual to determine compliance with established apparel compliance practices and provide suggestions for overcoming non-compliance. The system includes a server including at least one processing device and at least one memory device operably coupled to the at least one processing device. The server is in operable communication with a plurality of external computing devices. The server is configured to capture, through one or more of the plurality of external computing devices, apparel compliance practices that are related to one or more of practices directed toward inclusion and exclusion of one or more items of apparel during one or more activities, and historical incidents related to the one or more items of apparel during the one or more activities. The server is also configured to generate a knowledge base including data associated with managing apparel for one or more of jurisdictional compliance and extra-jurisdictional compliance at least partially based on the apparel compliance practices. The server is further configured to capture, through the one or more of the plurality of external computing devices, apparel donned prior to commencement of the one or more activities. The server is also configured to compare the captured apparel donned with the data in the knowledge base. The server is further configured to determine, subject to the comparison, instances of compliance and non-compliance. The server is also configured to determine, for each instance of non-compliance, a risk level associated therewith. The server is further configured to communicate, to the one or more of the plurality of external computing devices, the determined risk level and methods to translate each instance of non-compliance to compliance. The server is also configured to store the instances of compliance and non-compliance within the knowledge base.

In another aspect, a computer program product is provided to manage apparel through dynamic analysis of apparel donned by an individual to determine compliance with established apparel compliance practices and provide suggestions for overcoming non-compliance. The computer program product includes one or more computer readable storage media, and program instructions collectively stored on the one or more computer storage media. The product includes program instructions to capture, through one or more of a plurality of computing devices, apparel compliance practices related to one or more of practices directed toward inclusion and exclusion of one or more items of apparel during one or more activities, and historical incidents related to the one or more items of apparel during the one or more activities. The product also includes program instructions to generate a knowledge base including data associated with managing apparel for one or more of jurisdictional compliance and extra-jurisdictional compliance at least partially based on the apparel compliance practices. The product further includes program instructions to capture, through the one or more of the plurality of computing devices, apparel donned prior to commencement of the one or more activities. The product also includes program instructions to compare the captured apparel donned with the data in the knowledge base. The product further includes program instructions to determine, subject to the comparison, instances of compliance and non-compliance. The product also includes program instructions to determine, for each instance of non-compliance, a risk level associated therewith. The product also includes program instructions to communicate, to the one or more of the plurality of computing devices, the determined risk level and methods to translate each instance of non-compliance to compliance. The product further includes program instructions to store the instances of compliance and non-compliance within the knowledge base.

In yet another aspect, a computer-implemented method to manage apparel through dynamic analysis of apparel donned by an individual to determine compliance with established apparel compliance practices and provide suggestions for overcoming non-compliance. The method includes capturing, through one or more of the plurality of computing devices, apparel donned prior to commencement of one or more activities. The method also includes comparing the captured apparel donned with data in the knowledge base including apparel compliance practices directed toward inclusion and exclusion of one or more items of apparel during one or more activities. The method also includes determining, subject to the comparison, instances of compliance and non-compliance. The method further includes determining, for each instance of non-compliance, a risk level associated therewith. The method also includes communicating, to the one or more of the plurality of computing devices, the determined risk level and methods to translate each instance of non-compliance to compliance. The method further includes storing the instances of compliance and non-compliance within the knowledge base.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
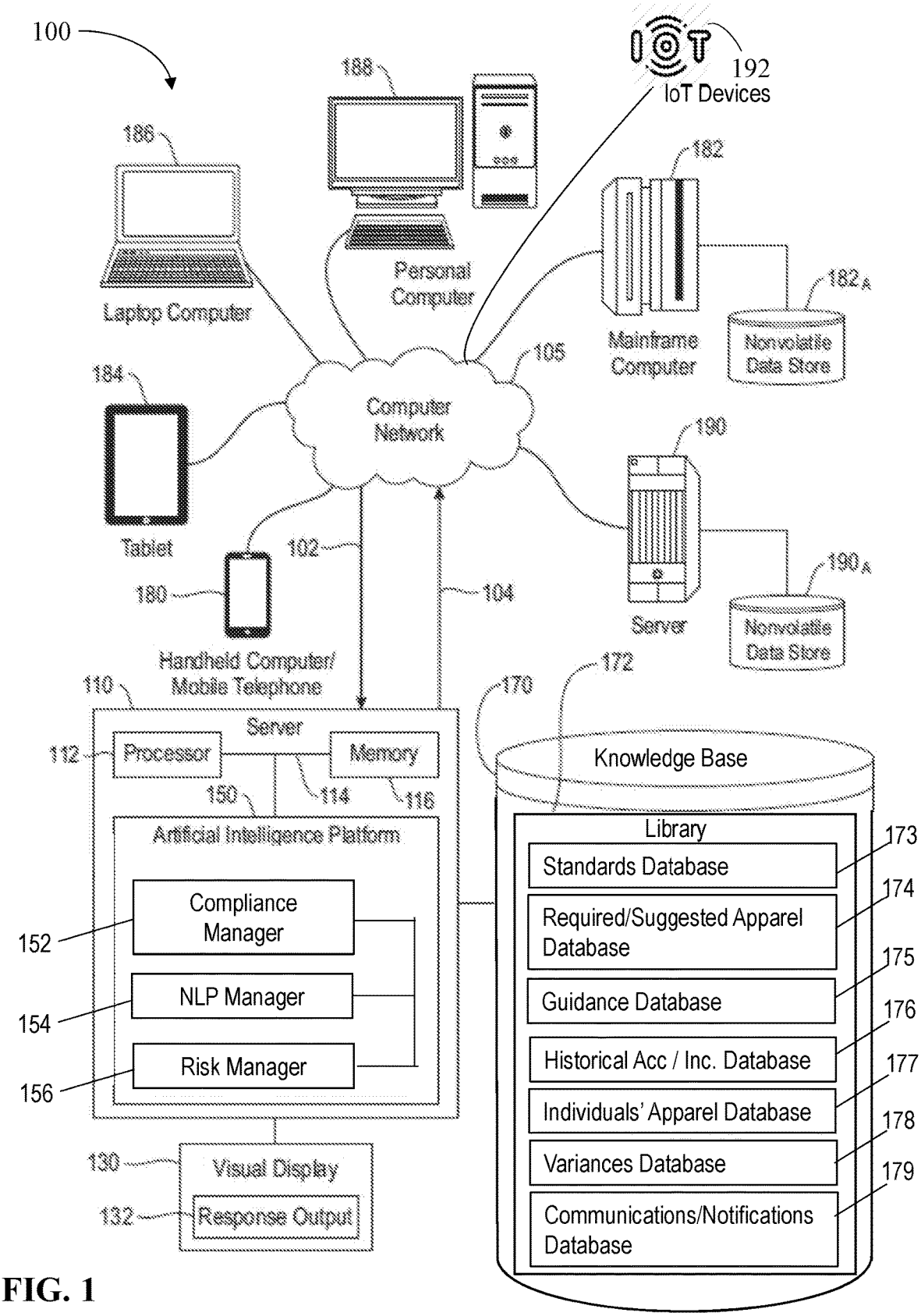
FIG. 1 is a schematic diagram illustrating a computer system including an artificial intelligence platform suitable for dynamically analyzing the apparel donned by an individual to determine compliance with established apparel compliance practices and provide suggestions for overcoming non-compliance, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many occupational professions, for a large variety of environments and activities, have written requirements for the donning of apparel, including protective or safety apparel, i.e., personal protective equipment (PPE). Apparel, as used herein, includes standard clothing articles (including, without limitation, standard casual and dress footwear, long-sleeved shirts, jackets, and neckties), accessories (e.g., and without limitation, jewelry (including piercings, pedants, broaches, watches, rings, and necklaces)) and hair care articles (including clips and bands), and PPE. The occupational professions include, without limitation, environmental monitoring and remediation, public service (e.g., police, emergency medical technicians (EMTs), firemen, and military), medical (e.g., doctors, registered nurses, and laboratory technicians), construction trades, industrial production (e.g., factories and power plants), and agricultural production (e.g., farms, grain transfer, extracts production, and rendering plants). Accordingly, a great number of occupational professions have a great number of tasks and environments that require a broad spectrum of PPE.

A tremendous amount of written material relevant to personal protective equipment for each occupational profession exists in the form of, for example, and without limitation, promulgated rules, regulations, standards, procedures, instructions, codes, and guidelines by one or more government agencies. For example, for nuclear workers and respiratory protection equipment (RPE), the U.S. Department of Labor's Occupational Safety and Health Administration (OSHA) and the U.S. Nuclear Regulatory Commission (NRC) both have issued mandatory requirements. In some embodiments, overlapping government agencies include jurisdictional (e.g., OSHA, NRC, and State agencies for U.S. nuclear workers) and extra-jurisdictional (e.g., the Federal Ministry for the Environment, Nature Conservation and Nuclear Safety (BMU) for nuclear workers in Germany). However, in some instances, the German published regulations may have some relevancy, with no direct regulatory effect, with respect to practices affecting U.S. workers. Moreover, the German regulations do have requirements that affect U.S. workers visiting Germany in the capacity of nuclear workers. Accordingly, a large volume of jurisdictional and extra-jurisdictional agencies and their respective published materials need to be ingested, considered, and adhered to.

For further example, again without limitation, promulgated standards, guidelines, suggestions, protocols, conventions, and customs by one or more private sector industries through one or more respective industrial associations provide relevant information for the selection and use of PPE. For example, and without limitation, various mining trade publications and construction trade publications may provide additional information relevant to the proper selection and use of PPE in their respective occupations that, while not carrying the force of law, have been proven effective in reducing occupational risks. Moreover, promulgated rules, standards, procedures, guidelines, suggestions, protocols, conventions, and customs by one or more private sector entities provide information, often as a condition of employment, to further reduce risk of exposure of personnel to hazardous conditions. In at least some embodiments, the private sector entities are corporate entities, such as construction companies, and insurance carriers. In some other embodiments, the private sector entities are non-corporate, such as, and without limitation, insurance consultants, public interest organizations, trade organizations, watchdog groups, and training organizations. Furthermore, relevant documents include historical incident reports and apparel problem reports, for example and without limitation, reports from a Chamber of Commerce or a Parks Department with respect to incidents of individuals reporting foot injuries due to improper, or lack of, use of proper footwear. Accordingly, a large amount of material is available to facilitate use of PPE and reduce the relevant risks.

In addition to the aforementioned organizations publishing requirements for what to wear in certain circumstances, many of the same organizations publish materials ranging from statutory to good guidance with respect to apparel, that is, clothing articles and accessories that are not appropriate for the respective conditions and activities. For example, and without limitation, non-steel-toed work boots in construction zones and jewelry in the vicinity of energized electrical devices open for inspection are typically disallowed, but are not always easy to spot by the respective individuals and geofence entry monitors. In addition, an organization may be responsible (i.e., liable) for enforcing requirements for individuals in their sphere of influence and ensuring they are being monitored for appropriate apparel. Non-limiting examples of such conditions include a dental hygienist ensuring that a patient has a lead covering over them for an x-ray imaging procedure and an amusement park making sure that a customer is not wearing shoes when going on a bungee jump where the falling of shoes could cause injury to others below.

Therefore, in at least some embodiments, the volume of information available globally may be used to generate a library of relevant information for reducing risk levels of the respective activities. As such, the assembled library may be jurisdictionally-, occupationally-, and task-agnostic, that is, mechanisms to improve rates of compliance, decrease instances of non-compliance, and decrease the respective risk levels that are cross-applicable are not exclusively isolated to the originally referenced jurisdictions, occupations, and tasks. As used herein, jurisdictionally-agnostic does not refer to circumvention of localized requirements in any jurisdiction, rather, it refers to enhancing localized jurisdictional requirements with information culled from other sources known to reduce the respective risk levels, including other jurisdictions.

In some embodiments, enforcement of the myriad rules, standards, regulations, etc. may vary from industry-to-industry, company-to-company, site-to-site, and individual-to-individual. For example, in some embodiments, not all individuals with responsibilities in the use of PPE may have the same level of expertise and training. Additionally, apparel may, or may not, be one-size-fits-all, thereby necessitating additional scrutiny of matching the individuals to the proper apparel that may be necessitated by the individuals' physical biometrics (e.g., temperature, height, and weight) or individuals with known physical accommodation requirements or boundaries which may drive adherence to different apparel standards, (e.g., known allergies to latex materials). Some of such individuals may have their own personal preferences for apparel, and some may provide their own apparel. Also, during large-scale projects, such as building construction and medical responses to medical emergencies may create environments where a relatively large number of workers and the respective PPE may present relative difficulty in tracking worker habits and associated diligence. Moreover, in some embodiments, non-complimentary, yet relevant written materials may cause confusion. Furthermore, in some embodiments, individuals may forget to research and determine the appropriate apparel to wear for certain activities in certain environments. Also, in some embodiments, individuals may erroneously determine the selections. Moreover, in some embodiments, individuals may not remember to remove certain items of apparel. Therefore, for at least these reasons, the respective individual and a human monitor may not always find particular apparel deficiencies. In some embodiments, technology is leveraged, such as, and without limitation, use of a wireless transmitting device, including a passive or active Radio Frequency Identification (RFID) tag that includes a localized power source. However, such RFIDs, or one of the downstream devices, may malfunction and not all items of required apparel will have the RFIDs. Accordingly, exclusive reliance on human efforts, even with an assist from assorted technologies, may not reduce risk to the lowest practicable levels.

In at least some embodiments, the nature of the environment with respect to the level of risk present may be dynamic, thereby presenting a dynamic level of apparel required commensurate with the newly determined risk level. In addition, workers may be tasked with activities within different sections of a site requiring different apparel. Furthermore, the published materials are periodically updated with revised lawful standards, newly introduced products, and improved methods of compliance and there is a temporal lag to promulgate the revisions within an affected organization. Moreover, many workers are required to travel to a number of different jurisdictions, including internationally, and the apparel requirements are likely to change accordingly, thereby presenting a challenge to meet the localized requirements. Additionally, reporting of compliance with apparel requirements to insurance carriers and government entities is a time-consuming and labor-intensive task. Manual reporting methods may inadvertently exclude appropriate data and proper auditing places further pressures on limited staffing availability. Furthermore, individualized instances of adherence, or lack thereof, and the associated risk levels, and any remedial actions to remedy in-situ compliance issues with sufficient granularity may not be recorded. Accordingly, a significant amount of effort is required to maintain compliance standards.

Artificial Intelligence (AI) is one example of cognitive systems that relate to the field of computer science directed at computers and computer behavior as related to humans. Cognitive computing utilizes self-teaching algorithms that use data, visual recognition, and natural language processing (NLP) to solve problems and optimize human processes. The NLP features analyze the collected relevant materials as subject matter data as received from the sources as discussed herein. As the subject matter data is received, organized, and stored, the NLP features analyze the data to determine the relevant details through computational linguistics that provides parsing and semantic interpretation of the received text, which allows the associated systems to learn, analyze, and understand human language, including within the context of the present disclosure. With such an understanding, the AI can surface concepts, categories, sentiment, and emotion, and apply the acquired knowledge to extract the relevant portions of the received materials.

In addition, cognitive systems such as AI, based on information, are able to make decisions, which maximizes the chance of success in a given topic. More specifically, AI is able to learn from a data set to solve problems and provide relevant recommendations. For example, in the field of artificial intelligent computer systems, machine learning (ML) systems process large volumes of data, seemingly related or unrelated, where the ML systems may be trained with data derived from a database or corpus of knowledge. The ML systems look for, and determine, patterns, or lack thereof, in the data, "learn" from the patterns in the data, and ultimately accomplish tasks without being given specific instructions. In addition, the ML systems, utilizes algorithms, represented as machine processable models, to learn from the data and create foresights based on this data. More specifically, ML is the application of AI, such as, and without limitation, through creation of neural networks that can demonstrate learning behavior by performing tasks that are not explicitly programmed. Deep learning is a type of neural-network ML in which systems can accomplish complex tasks by using multiple layers of choices based on output of a previous layer, creating increasingly smarter and more abstract conclusions.

ML learning systems may have different "learning styles." One such learning style is supervised learning, where the data is labeled to train the ML system through telling the ML system what the key characteristics of a thing are with respect to its features, and what that thing actually is. If the thing is an object or a condition, the training process is called classification. If the thing is a number, the training process is called regression. Accordingly, supervised learning specializes in predicting the future.

A second learning style is unsupervised learning, where commonalities and patterns in the input data are determined by the ML system through little to no assistance by humans. Most unsupervised learning focuses on clustering, i.e., grouping the data by some set of characteristics or features. These may be the same features used in supervised learning, although unsupervised learning typically doesn't use labeled data. Accordingly, unsupervised learning may be used to find outliers and anomalies in a dataset.

The third learning style is reinforcement learning, where positive behavior is "rewarded: and negative behavior is "punished." Reinforcement learning uses an "agent," the agent's environment, a way for the agent to interact with the environment, and a way for the agent to receive feedback with respect to its actions within the environment. An agent may be anything that can perceive its environment through sensors and act upon that environment through actuators. Therefore, reinforcement learning rewards or punishes the ML system agent to teach the ML system how to most appropriately respond to certain stimuli or environments. Accordingly, over time, this behavior reinforcement facilitates determining the optimal behavior for a particular environment or situation.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing devices that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. At a basic level, each layer of the neural network includes one or more operators or functions operatively coupled to output and input. Output from the operator(s) or function(s) of the last hidden layer is referred to herein as activations. Eventually, a result is delivered from the output layers. Deep learning complex neural networks are designed to emulate how the human brain works, so computers can be trained to support poorly defined abstractions and problems. Therefore, deep learning is used to predict an output given a set of inputs, and either supervised learning or unsupervised learning can be used to facilitate such results.

Referring to FIG. 1, a schematic diagram is provided illustrating a computer system 100, that in the embodiments described herein, is an apparel compliance system 100. In at least one embodiment, the apparel compliance system 100 is embodied as a cognitive system, i.e., an artificial intelligence (AI) platform computing system that includes an artificial intelligence platform 150 suitable for dynamically analyzing the apparel donned by an individual to determine compliance with established apparel compliance practices and provide suggestions for overcoming non-compliance.

As shown, a server 110 is provided in communication with a plurality of computing devices 180, 182, 184, 186, 188, 190, and 192 across a computer network connection 105. The computer network connection 105 may include several information handling devices. Types of information handling devices that can utilize the apparel compliance system 100 range from small handheld devices, such as a handheld computer/mobile telephone 180 to large mainframe systems, such as a mainframe computer 182. Examples of information handling systems includes, personal digital assistants (PDAs), personal entertainment devices, pen or tablet computer 184, laptop or notebook computer 186, personal computer system 188, server 190, and one or more Internet of Things (IoT) devices 192, that in at least some embodiments, include connected cameras. As shown, the various information handling systems can be networked together using the computer network connection 105.

Various types of a computer networks can be used to interconnect the various information handling systems, including Local Area Networks (LANs), Wireless Local Area Networks (WLANs), the Internet, the Public Switched Telephone Network (PSTN), other wireless networks, and any other network topology that can be used to interconnect information handling systems and computing devices as described herein. Many of the information handling systems include non-volatile data stores, such as hard drives and/or non-volatile memory. Some of the information handling systems may use separate non-volatile data stores, e.g., server 190 utilizes non-volatile data store 190*a*, and mainframe computer 182 utilizes non-volatile data store 182*a*. The non-volatile data store 182*a* can be a component that is external to the various information handling systems or can be internal to one of the information handling systems.

The server 110 is configured with a processing device 112 in communication with memory 116 across a bus 114. The server 110 is shown with the artificial intelligence (AI) platform 150 for cognitive computing, including machine learning, over the computer network connection 105 from one or more of the computing devices 180, 182, 184, 186, 188, 190, and 192. More specifically, the computing devices 180, 182, 184, 186, 188, 190, 192 communicate with each other and with other devices or components via one or more wired and/or wireless data communication links, where each communication link may comprise one or more of wires, routers, switches, transmitters, receivers, or the like. In this networked arrangement, the server 110 and the computer network connection 105 enable communication, detection, recognition, and resolution. The server 110 is in operable communication with the computer network through communications links 102 and 104. Links 102 and 104 may be wired or wireless. Other embodiments of the server 110 may be used with components, systems, sub-systems, and/or devices other than those that are depicted herein.

The AI platform 150 is shown herein configured with tools to enable one or more of deep learning techniques to generate models configured to establish patterns (both previously established and newly discovered by the AI platform 150) from unstructured data, one or more of the supervised learning techniques to make predictions, and one or more of the unsupervised learning techniques to generate conclusions based on new information. In addition, in at least some embodiments, the AI platform 150 may receive reinforced learning through a manual review of video and other media inputs and tagging individuals or incidents that are not in compliance to at least partially close any learning gaps between an analysis of apparel being worn and the corpus used to train the AI platform 150 (as discussed further herein). The tools function to implement a methodology for dynamically analyzing the apparel donned by an individual to determine compliance with established apparel compliance practices and provide suggestions for overcoming non-compliance. It is understood in the art that in at least one embodiment, non-compliance with the respective apparel requirements increases the respective risk factors of associated activities. Accordingly, in at least one embodiment, machine learning techniques are used to train the AI platform 150 to determine and enforce the proper apparel to be worn by individuals in a jurisdictionally-, occupationally-, and task-agnostic manner.

The tools shown herein include, but are not limited to, a compliance manager 152, a natural language processing (NLP) manager 154, and a risk manager 156, where the compliance manager 152, the NLP manager 154, and the risk manager 156 include the machine learning (ML) features. The compliance manager 152, the NLP manager 154, and the risk manager 156 are described further herein with respect to FIGS. 2-6.

The AI platform 150 may receive input from the computer network connection 105 and leverage a knowledge base 170, also referred to herein as a corpus or data source, to selectively access training and other data. The knowledge base 170 is provided operably coupled to the server 110 including the processing device 112 and/or memory 116. In at least one embodiment, the knowledge base 170 may be operably coupled to the server 110 across the computer network connection 105. In at least one embodiment, the knowledge base 170 includes a library 172 that may be in the form of one or more databases. The library 172 includes different databases, including, but not limited to, a standards database 173, a required/suggested apparel database 174, a guidance database 175, an historical accident/incident database 176, an individuals' apparel database 177, a variances database 178, and a communications/notifications database 179, where the seven databases are described further herein. Accordingly, the server 110 including the AI platform 150, compliance manager 152, the NLP manager 154, and the risk manager 156 receive information from the computer network connection 105 and the devices connected thereto, and the knowledge base 170.

In at least some embodiments, the standards database 173 includes the relevant published materials from the government agencies. Also, in some embodiments, the required/suggested apparel database 174 includes the relevant apparel information culled, by the NLP manager 154, from the large volume of materials for the relevant occupational roles and associated tasks and activities. In some embodiments, the required/suggested apparel database 174 also includes a substantially comprehensive list and inventory of all authorized protective apparel for an organization or entity. In some embodiments, the knowledge base 170 also includes a separate inventory database for the associated entity, or at least a portion thereof. Accordingly, the required/suggested apparel database 174 is built subject to the materials ingested into the standards database 173 (and the additional databases described herein), where the required/suggested apparel database 174 is configured to provide the apparel standards required for compliance with the respective safety standards.

In some embodiments, the guidance database 175 includes the materials from the private sector entities (corporate and non-corporate), including industrial associations, that have been ingested within the library 172 of the knowledge base 170 and parsed through the NPL manager 154. Further, in some embodiments, the historical/accident incident database 176 includes data from published materials that is sorted as a factor of, and without limitation, particular industries, particular items of apparel, and the nature of the injuries (if any).

Moreover, in at least some embodiments, the individuals' apparel database 177 includes data with respect to each individual worker's apparel, including personal apparel, that may be worn to a work site. Such database 177 is populated through the consent of the individuals. The variances database 178 includes data associated with instances and details of apparel variances captured through the systems and methods described herein based on the required/suggested apparel database 174 contents. In some embodiments, the variances database 178 includes data, such as, and without limitation, the identity of the individuals associated with the variance, the risk factor associated with the variance, and the methods used to eliminate or reduce the variance. The communications/notifications database 179 maintains data associated with, for example, and without limitation, communications between the individuals and the server 110 with respect to compliance variances.

A response output 132 includes, for example, and without limitation, whether a particular individual is in full compliance with the respective apparel requirements, or whether non-compliance deficiencies exist, the associated details of the deficiencies, with potential solutions for overcoming the reported deficiencies. Further details of the information displayed is described in FIGS. 4 and 6.

In at least one embodiment, the response output 132 is communicated to a corresponding network device, shown herein as a visual display 130, operatively coupled to the server 110 or in at least one other embodiment, operatively coupled to one or more of the computing devices 180-192 across the computer network connection 105.

The computer network connection 105 may include local network connections and remote connections in various embodiments, such that the artificial intelligence platform 150 may operate in environments of any size, including local and global, e.g., the Internet. Additionally, the AI platform 150 serves as a front-end system that can make available a variety of knowledge extracted from or represented in network accessible sources and/or structured data sources. In this manner, some processes populate the AI platform 150, with the AI platform 150 also including one or more input interfaces or portals to receive requests and respond accordingly.

Figure 2:
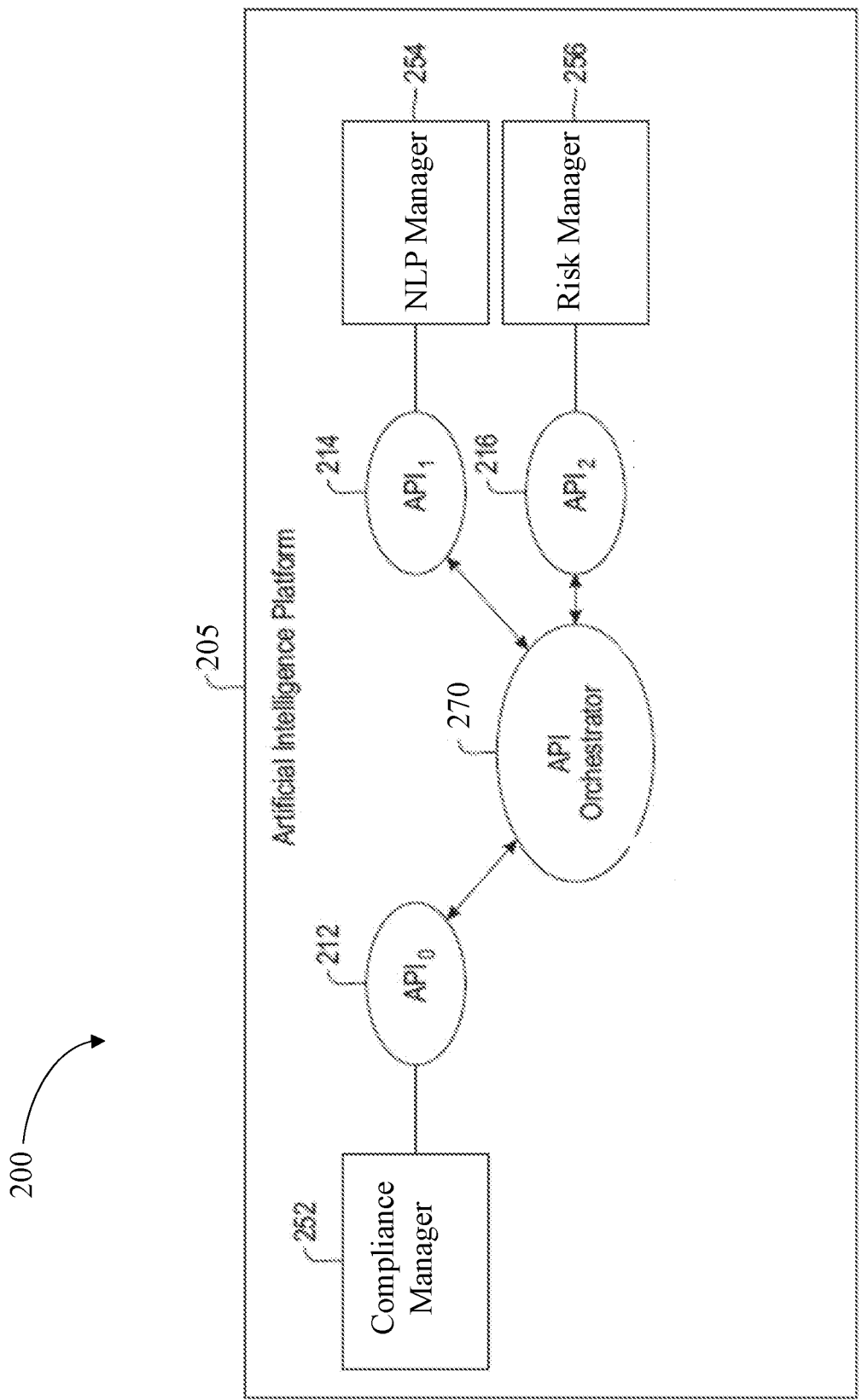
FIG. 2 is a block diagram illustrating artificial intelligence platform tools, as shown and described in FIG. 1, and their associated application program interfaces, in accordance with some embodiments of the present disclosure.

An Application Program Interface (API) is understood in the art as a software intermediary, e.g., invocation protocol, between two or more applications which may run on one or more computing environments. With respect to the AI platform 150 shown and described in FIG. 1, one or more APIs may be utilized to support one or more of the tools 152-156 and their associated functionality. Referring to FIG. 2, a block diagram 200 is provided illustrating the tools 252-256 and their associated APIs. As shown, a plurality of tools is embedded within the AI platform 205, that is equivalent to the AI platform 150 (shown in FIG. 1). The AI platform 205 includes the tools including, but not limited to, the compliance manager 152 (shown herein as 252) associated with $API_0$ 212, the NLP manager 154 (shown herein as 254) associated with APE 214, and the risk manager 156 (shown herein as 256) associated with $API_2$ (216).

Each of the APIs may be implemented in one or more languages and interface specifications. $API_0$ 212 provides functional support for, without limitation, populating the required/suggested apparel database 174, defining the scope of monitoring at monitored locations, capturing the apparel donned by the respective individuals, and using an electronic calendar to facilitate compliance through a plurality of monitored locations. APE 214 provides functional support for, without limitation, employing natural language processing (NLP) to facilitate the capture of apparel compliance practices and managing all aspects of the intake of the relevant materials. $API_2$ 216 provides functional support for, without limitation, analyzing the data in the knowledge base 170 to determine a risk factor associated with each article of apparel resident therein under the respective conditions and/or environment.

As shown, each of the APIs 212, 214. and 216 are operatively coupled to an API orchestrator 270, otherwise known as an orchestration layer, which is understood in the art to function as an abstraction layer to transparently thread together the separate APIs. In at least one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
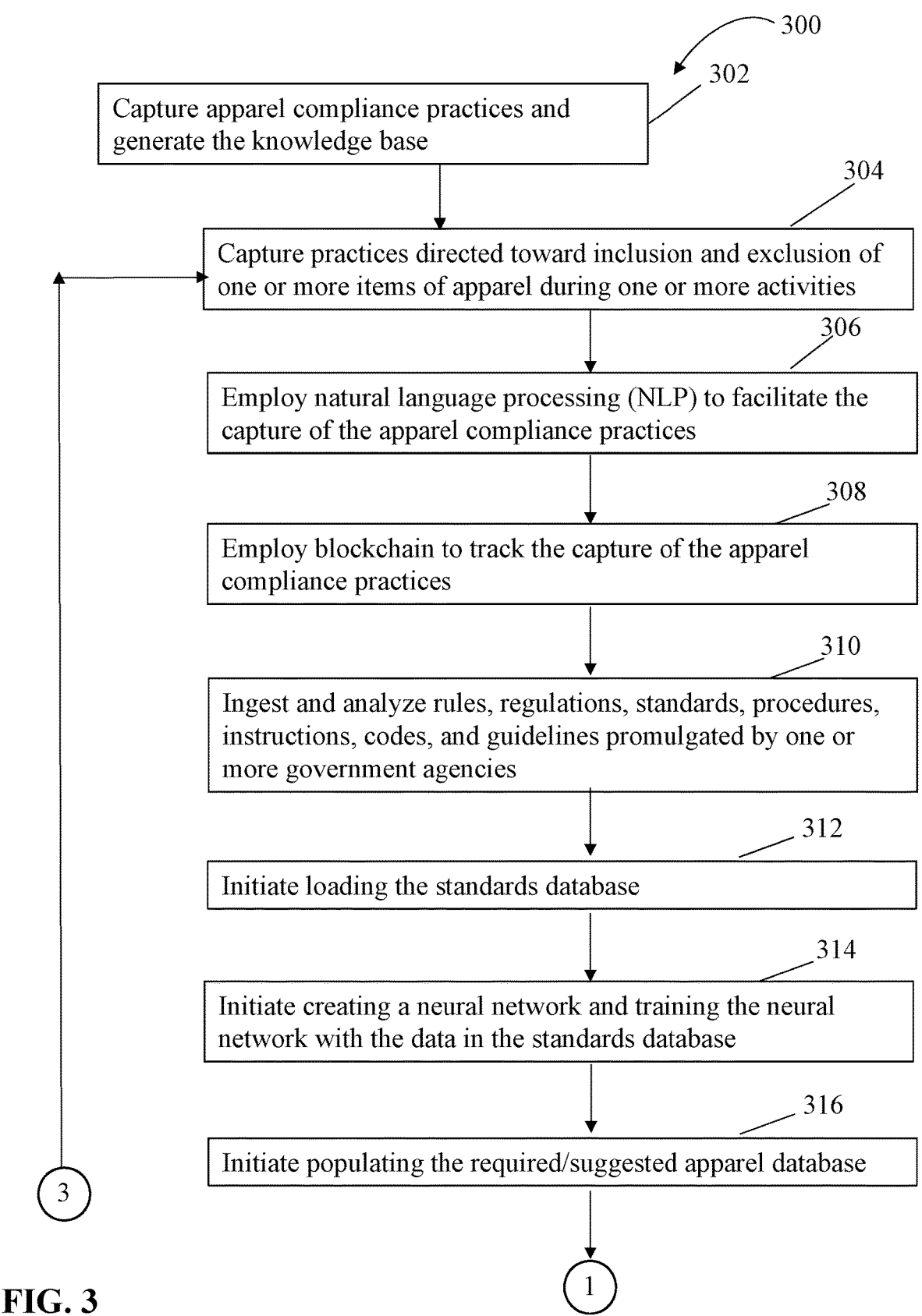
FIG. 3 is a flow chart illustrating a process for capturing apparel compliance practices and generating a knowledge base, in accordance with some embodiments of the present disclosure.
Figure 3:
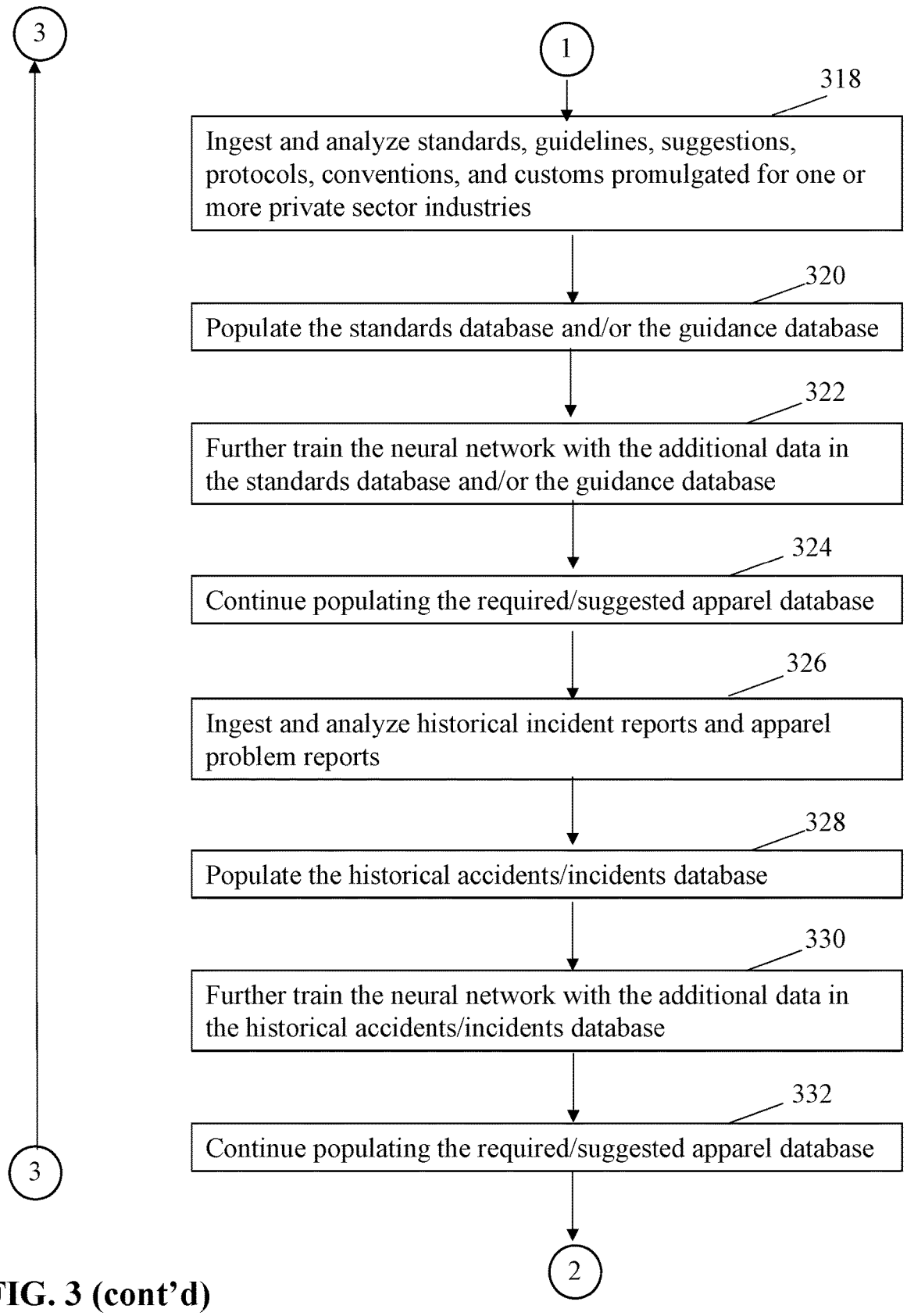
Figure 3:
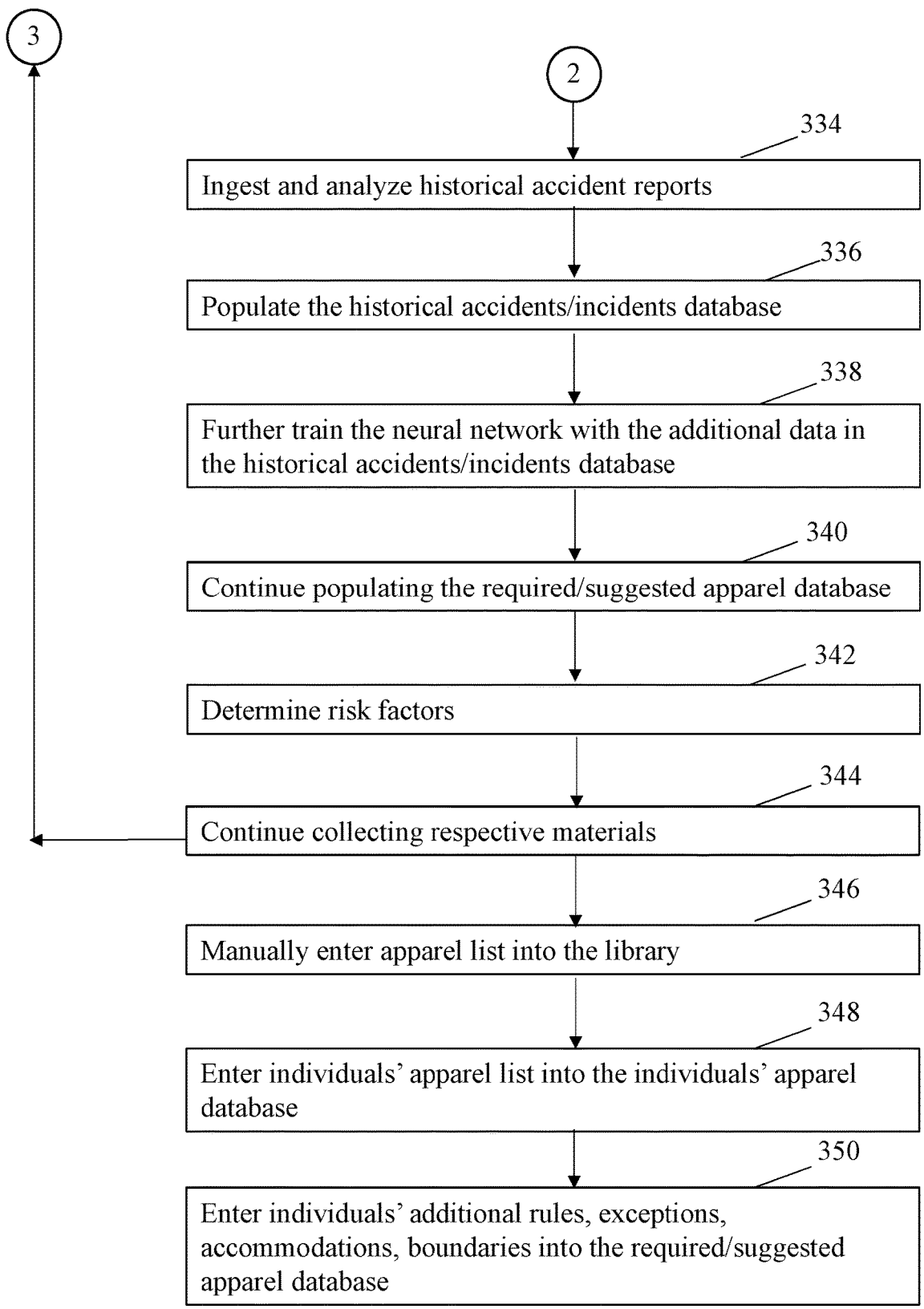

Referring to FIG. 3, a flow chart is provided illustrating a process 300 for capturing 302 apparel compliance practices and generating the knowledge base 170. The process 300 includes capturing 304 practices directed toward inclusion and exclusion of one or more items of apparel during one or more activities. To facilitate the capturing operation 304, the apparel compliance system 100 employs 306 natural language processing (NLP) to facilitate the capture 304 of the apparel compliance practices through the NLP manager 154. The NLP features embedded within the NLP manager 154 analyze the collected relevant materials as subject matter data as they are received from the sources as discussed further herein. As the subject matter data is received, organized, and stored, the NLP features within the NLP manager 154 analyze the data to determine the relevant details through computational linguistics that provides parsing and semantic interpretation of the received text, which allows the apparel compliance system 100 to learn, analyze, and understand the human language associated with apparel compliance practices, including those practices within the context of the present disclosure. With such an understanding, the AI platform 150 will surface concepts, categories, sentiment, and emotion, and apply the acquired knowledge to extract the relevant portions of the received materials. In at least one embodiment, as the materials are collected, the apparel compliance system 100 employs 308 a blockchain application to track the capture of apparel compliance practices, thereby generating an auditable documentation trail. Accordingly, the NLP manager 154 identifies the respective requirements relating to apparel compliance and determines when, where, and how those rules are applicable.

In at least one embodiment, the NLP manager 154 manages all aspects of the intake of the relevant materials. In some embodiments, the materials intake is at least partially facilitated by human assistance to identify the sources of the materials and the materials themselves to initiate the training of the AI platform 150. The NLP manager 154 ingests 310 and analyzes written material relevant to apparel compliance for the relevant occupational professions in the form of, for example, and without limitation, promulgated rules, regulations, standards, procedures, instructions, codes, and guidelines by one or more government agencies. For example, for nuclear workers and respiratory protection equipment (RPE), the U.S. Department of Labor's Occupational Safety and Health Administration (OSHA) and the U.S. Nuclear Regulatory Commission (NRC) both have issued mandatory requirements. In some embodiments, overlapping government agencies include jurisdictional (e.g., OSHA, NRC, and State agencies for U.S. nuclear workers) and extra-jurisdictional (e.g., the Federal Ministry for the Environment, Nature Conservation and Nuclear Safety (BMU) for nuclear workers in Germany). However, in some instances, the German published regulations may have some relevancy, with no direct regulatory effect, with respect to practices affecting U.S. workers. Moreover, the German regulations do have requirements that affect U.S. workers visiting Germany in the capacity of nuclear workers. Accordingly, a large volume of jurisdictional and extra-jurisdictional agencies and their respective published materials are ingested, analyzed, considered, and are loaded 312 into the standards database 173 within the library 172 of the knowledge base 170.

In at least some embodiments, a neural network (not shown) is created 314 in the AI platform 150 and the initial load of data resident within the standards database 173 associated with government-issued materials is used to train the neural network. In some embodiments, the training of the neural network is started after at least a portion of the additional data as described herein is loaded into the standards database 173. In some of those embodiments, all the known and available data is loaded into the standards database 173 for the initial data loading. Upon completion of the initial training of the neural network, the neural network is tested for a predetermined period of time with testing data to determine a satisfactory performance level of the AI platform 150 with respect to properly determining the required apparel for given conditions and/or environments, tasks, and activities. In order to facilitate such apparel determinations, the required/suggested apparel database 174 is populated 316 through the compliance manager 152, where the required/suggested apparel database 174 includes an apparel list, including PPE, that is either mandated or suggested for the respective conditions and/or environments, tasks, and activities. Accordingly, the neural network of the AI platform 150 is initially trained with the government-mandated requirements.

Furthermore, in at least one embodiment, the NLP manager 154 ingests 318 and analyzes promulgated standards, guidelines, suggestions, protocols, conventions, and customs by one or more private sector industries through one or more respective industrial associations with respect to the selection and use of apparel to facilitate meeting the aforementioned government standards. For example, and without limitation, various mining trade publications and construction trade publications may provide additional information relevant to the proper selection and use of protective apparel in their respective occupations that, while not carrying the force of law, have been proven effective in reducing occupational risks. Moreover, promulgated rules, standards, procedures, guidelines, suggestions, protocols, conventions, and customs by one or more private sector entities provide information, often as a condition of employment, to further reduce risk of exposure of personnel to hazardous conditions. In at least some embodiments, the private sector entities are corporate entities, such as construction companies, and insurance carriers. In some other embodiments, the private sector entities are non-corporate, such as, and without limitation, insurance consultants, public interest organizations, trade organizations, watchdog groups, and training organizations. Accordingly, any private sector entities that may provide useful information for the use and care of protective apparel and compliance with government mandates may be accessed and the appropriate materials collected therefrom.

In some embodiments, a determination is made by the NLP manager 154 after the initial training and testing of the neural network with the government-mandated data within the standards database 173 of whether to populate the standards database 173 or the guidance database 175 with the results of the analyses by the NLP manager 154 of the private sector industries and organizations materials. In at least some of such embodiments, the determination is at least partially based on a predetermined disposition of such materials made by the managers of the apparel compliance system 100. Also, in at least some of those embodiments, the determination is made exclusively by the NLP manager 154 based on whether the standards database 173 would be enhanced to for strict compliance or the analyzed material would be better suited to be presented as guidance to the users of the apparel compliance system 100. Moreover, in some embodiments, the NLP manager 154 may determine that the ingested and analyzed materials from private sector industries and organizations are deposited in either the standards database 173 and the guidance database 175 and are cross-referenced therebetween. Accordingly, a large volume of published materials from private sector industries and organizations are ingested, analyzed, considered, and are loaded 320 into either the standards database 173 or the guidance database 175.

In at least some embodiments, the neural network in the AI platform 150 is further trained 322 with the additional load of data resident within the standards database 173 associated with materials from private sector industries and organizations. Upon completion of the additional training of the neural network, the neural network is tested for a predetermined period of time with the additional testing data to determine a satisfactory performance level of the AI platform 150 with respect to properly determining the required apparel for given conditions and/or environments, tasks, and activities. In order to facilitate such apparel determinations, the required/suggested apparel database 174 is further populated 324 with the additional data through the compliance manager 152, where the required/suggested apparel database 174 includes the apparel list, including PPE, that is either mandated or suggested for the respective conditions and/or environments, tasks, and activities. Accordingly, the neural network of the AI platform 150 is additionally trained with the materials from private sector industries and organizations.

In addition, in at least some embodiments, the NLP manager 154 ingests 326 and analyzes historical incident reports and apparel problem reports in order to capture historical incidents reported and problem reports related to one or more items of apparel during the respective tasks and activities in the respective conditions and environments. For example, and without limitation, such historical incidents materials include reports from a Chamber of Commerce or a Parks Department with respect to incidents of individuals at a beach, pool, or water park reporting foot injuries due to improper, or lack of, use of proper footwear. Further, for example, and without limitation, such problem reports related to items of apparel include known reported deficiencies with particular brands and models of PPE that may preclude use in certain environments and conditions to facilitate prudency until the issues are resolved. Therefore, in general, in at least some embodiments, the historical incident reports and apparel problem reports do not rise to the level of accident reports as discussed further herein. The neural network resident within the AI platform 150 may be trained to scour all known sources of such information including, without limitation, watchdog sites such as those of the Better Business Bureau, manufacturer sites, and news sources. In at least some embodiments, such additional information may represent a mandatory requirement for small, localized jurisdictions, or in other embodiments, represent sound advice to further reduce risk of exposure of personnel to hazardous conditions. In one or more embodiments, accident reports may be classified as such not necessarily due to any injuries incurred, but rather include, for example, and without limitation, instances of illness incurred as a direct result of non-compliance with the respective standards and reports of mere irritation on the bottom of feet at the beach. Accordingly, a large volume of published materials from historical incident reports and apparel problem reports are ingested, analyzed, considered, and are loaded 328 into the historical accidents/incidents database 176.

In at least some embodiments, the neural network in the AI platform 150 is further trained 330 with the additional load of data resident within historical accidents/incidents database 176 associated with materials including historical incident reports and apparel problem reports. Upon completion of the additional training of the neural network, the neural network is tested for a predetermined period of time with the additional testing data to determine a satisfactory performance level of the AI platform 150 with respect to properly determining the required apparel for given conditions and/or environments, tasks, and activities. In order to facilitate such apparel determinations, the required/suggested apparel database 174 is further populated 332 with the additional data through the compliance manager 152, where the required/suggested apparel database 174 includes the apparel list, including PPE, that is either mandated or suggested for the respective conditions and/or environments, tasks, and activities. Accordingly, the neural network of the AI platform 150 is additionally trained with the materials including historical incident reports and apparel problem reports.

Moreover, in at least some embodiments, the NLP manager 154 ingests 334 and analyzes historical accident reports in order to capture historical accidents reported related to one or more items of apparel during the respective tasks and activities in the respective conditions and environments. The neural network resident within the AI platform 150 may be trained to scour all known sources of such information including, without limitation, OSHA, safety/accident journals, and the Bureau of Labor Statistics. The NLP manager 154 parses the ingested accident reports to identify, without limitation, the environment and conditions where the accident occurred, and if apparel could have reduced the probability of the accident (if such information is available on the report.) In addition, the NLP manager 154 analyzes the accident reports of a specific site or a classification of a site (e.g., at a barn) that can be used as additional training data for further training the neural network. Furthermore, additional information may be extracted from the ingested accident reports, for example, and without limitation, information of individuals' physical biometrics (e.g., height) or individuals' known physical accommodation requirements or boundaries, which may indicate adherence, or lack thereof, to specific safety standards. Accordingly, published materials including historical accident reports are ingested, analyzed, considered, and are loaded 336 into the historical accidents/incidents database 176.

In at least some embodiments, the neural network in the AI platform 150 is further trained 338 with the additional load of data resident within historical accidents/incidents database 176 associated with materials including historical accident reports. Upon completion of the additional training of the neural network, the neural network is tested for a predetermined period of time with the additional testing data to determine a satisfactory performance level of the AI platform 150 with respect to properly determining the required apparel for given conditions and/or environments, tasks, and activities. In order to facilitate such apparel determinations, the required/suggested apparel database 174 is further populated 340 with the additional data through the compliance manager 152, where the required/suggested apparel database 174 includes the apparel list, including PPE, that is either mandated or suggested for the respective conditions and/or environments, tasks, and activities. Accordingly, the neural network of the AI platform 150 is additionally trained with the materials including historical accident reports.

Furthermore, in one or more embodiments, the risk manager 156 analyzes the data in the standards database 173, the guidance database 175, and the historical accidents/incidents database 176 to determine 342 a risk factor associated with each article of apparel resident within the required/suggested apparel database 174 under the respective conditions and/or environment. For example, and without limitation, the data stored in the library 172 may include the details of failure to adhere to the apparel compliance standards as issued. Also, for example, and without limitation, the risk manager 156 will analyze the historical accident reports' data in the historical accidents/incidents database 176 and determine the frequency of the accidents at a particular location, the outcomes of the accidents, and any other information that facilitates determining the risk factors for the respective apparel articles, the use thereof, at least partially as a factor of the conditions and/or environments associated with the collected historical accident data. In some embodiments, the respective risk factors may be determined through the risk manager 156 executing a root-cause-analysis of the accident details in the accident reports to determine the risk of non-compliance anecdotally. Accordingly, the risk manager 156 determines the risk factors associated with non-compliance of the respective apparel requirements.

Moreover, in at least some embodiments, the NLP manager 154 iterates the continuation 344 of collection of the respective materials, at least partially based on the trained neural network. Accordingly, the process 300 is returned to the practices capture operation 304.

In at least some embodiments, in addition to the aforementioned relevant requirements for what to wear in certain circumstances, many of the ingested materials include information ranging from statutory to good guidance with respect to apparel, that is, clothing articles and accessories, that are not appropriate for the respective conditions and activities. For example, and without limitation, non-steel-toed work boots in construction zones and jewelry in the vicinity of energized electrical devices open for inspection are typically disallowed, but are not always easy to spot by the respective individuals and geofence entry monitors. Accordingly, information directed toward apparel not appropriate for certain circumstances is also ingested and analyzed by the operations 304 through 344, and stored in the required/suggested apparel database 174.

In one or more embodiments, as discussed herein, the required/suggested apparel database 174 includes an apparel list generated through analysis of the ingested materials. In some embodiments, the list of appropriate, and inappropriate, apparel for the conditions, environments, tasks, and activities to be encountered are exclusively entered 346 into the required/suggested apparel database 174 through manual entry. In some of other embodiments, the list generated by the neural network is supplemented manually. Accordingly, an inventory of required and available apparel is resident within the library 172.

In at least some embodiments, individuals required to wear the apparel due to the assigned tasks and activities in the hazardous environments and conditions may elect to enter 348 their work and personal clothing and accessories into the individuals' apparel database 177. In some embodiments, the data may be entered through one of the IoT devices 192, including image data or an IoT signature of each article that is sufficient to determine if the respective individual is wearing, or not wearing, the respective articles.

In one or more embodiments, particular data associated with individuals that will be donning the respective apparel may be entered 350 into the required/suggested apparel database 174. Such particular data may include, without limitation, personalized additional rules and exceptions associated with the respective individuals. Apparel may, or may not, be one-size-fits-all, thereby necessitating additional scrutiny of matching the individuals to the proper apparel that may be necessitated by the individuals' physical biometrics (e.g., height and weight) or individuals with known physical accommodation requirements or boundaries which may drive adherence to different apparel standards, (e.g., known allergies to latex materials). Accordingly, the apparel compliance system 100 is configurable to include personalized details with respect to the apparel selections available to a variety of individuals.

Figure 4:
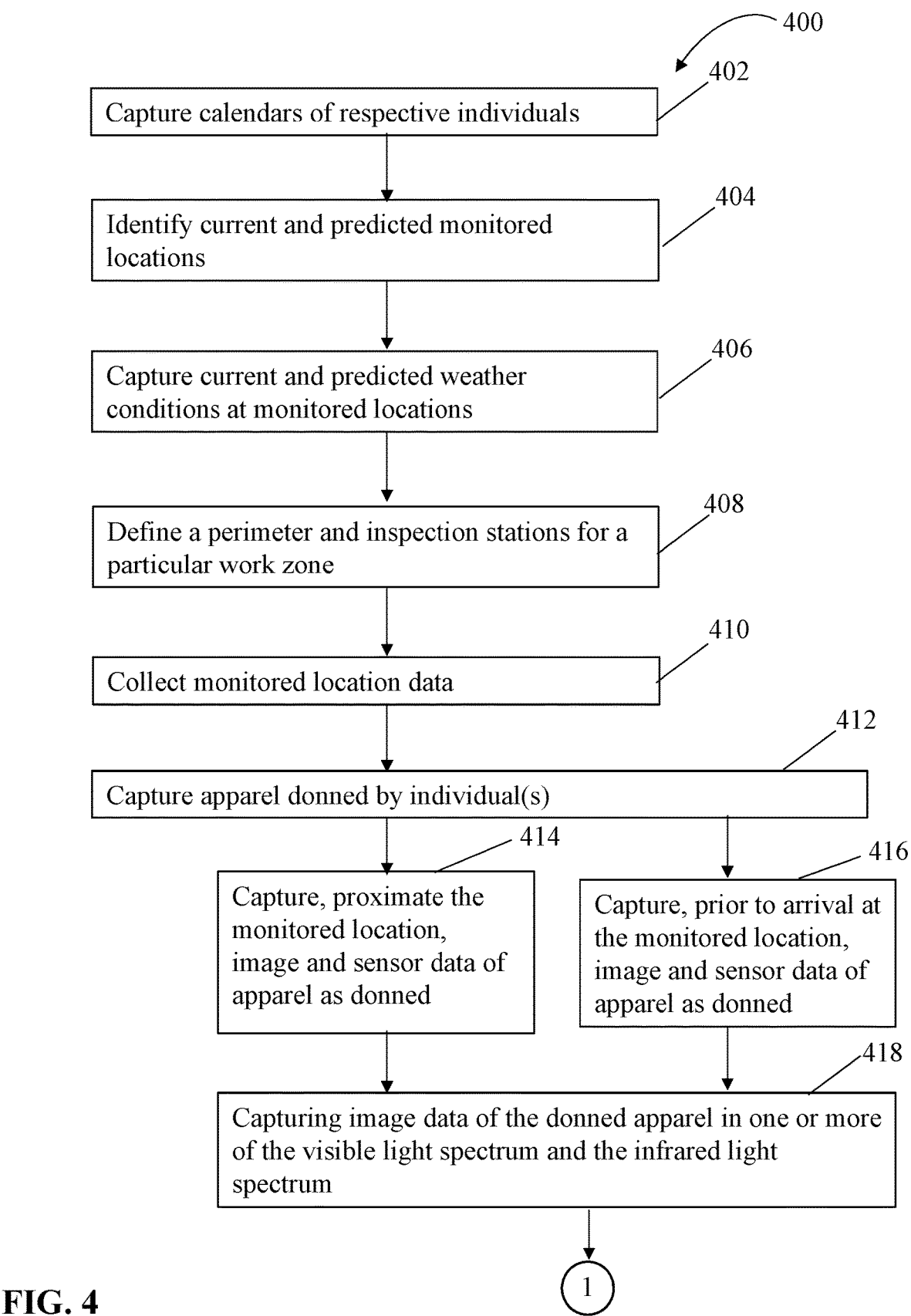
FIG. 4 is a flow chart illustrating a process for capturing apparel that has been donned and determining instances of compliance and non-compliance, in accordance with some embodiments of the present disclosure.
Figure 4:
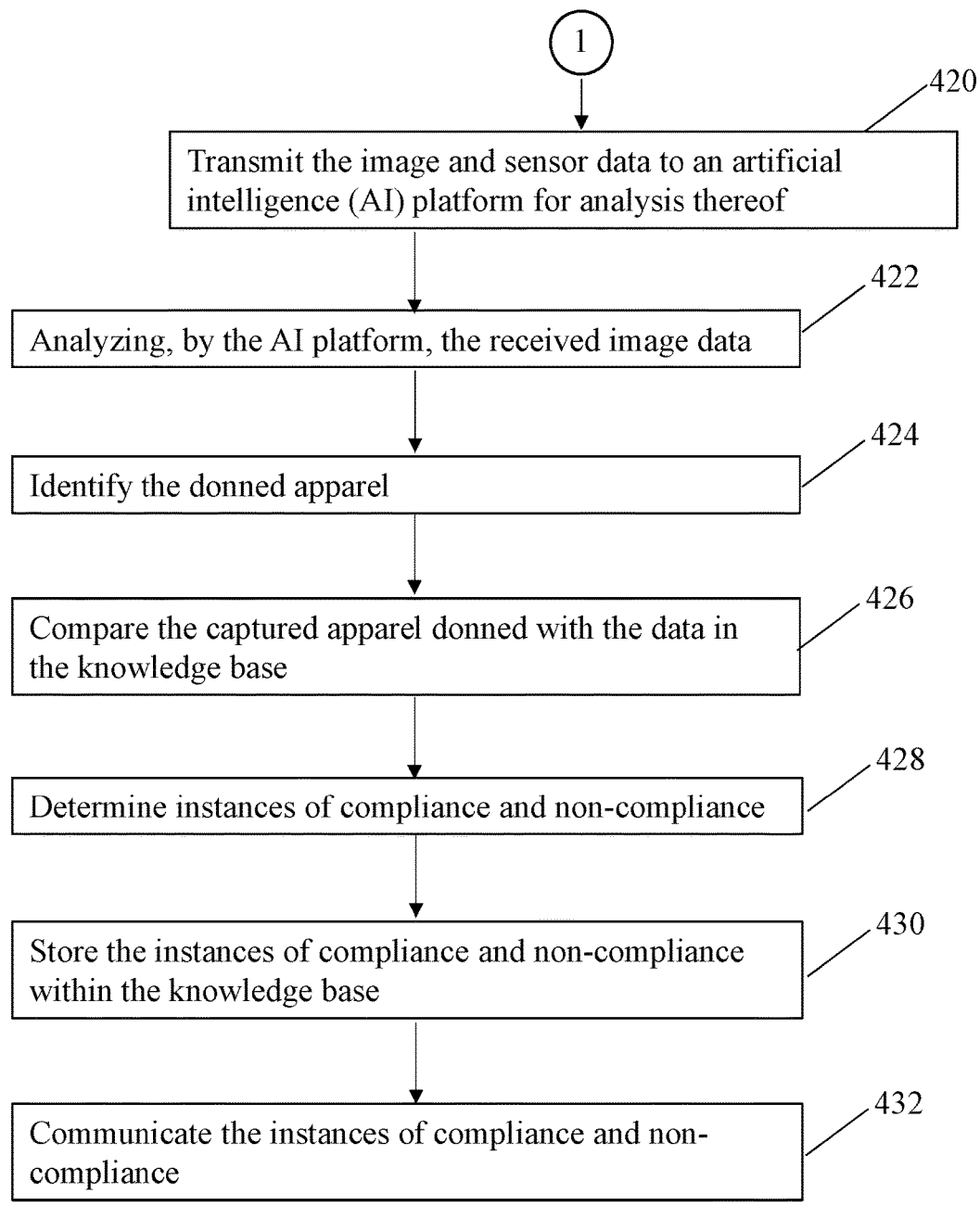

Referring to FIG. 4, a flow chart is provided illustrating a process 400 for capturing apparel that has been donned and determining instances of compliance and non-compliance. In at least some embodiments, a number of preliminary activities are performed to prepare the apparel compliance system 100 to execute its tasks of facilitating compliance with apparel standards for the assigned tasks and activities in the associated environment and conditions at the monitored locations. In at least some embodiments, the compliance manager 152 orchestrates the preliminary activities. Specifically, for example, in some embodiments, the calendars of the respective individuals are captured 402 to facilitate identifying 404 the current location and locations the individuals intend to be, i.e., predicted locations that include monitored locations. In addition, the process 400 includes capturing 406 current and predicted weather conditions at the monitored locations through devices such as, and without limitation, the IoT devices 192, as such conditions may impact safety requirements and at least partially define the individuals' apparel choices.

In one or more such embodiments, a perimeter and one or more associated inspection points are defined 408. In some of those embodiments, one or more geofences and one or more associated formal inspection stations are defined around monitored perimeters, where, as used herein, a geofence is a virtual perimeter or a virtual geographic boundary associated with a respective real-world geographic region. In at least some of those embodiments, the perimeters are defined by, for example, and without limitation, global positioning system (GPS) or RFID technology, that enables software to trigger a response when a mobile device enters or leaves a particular area via the established geofence. In at least one other embodiment, the perimeter is established though real-world perimeter devices including, without limitation, physical fences. In addition, in at least some embodiments, and without limitation, cameras and sensors of the IoT devices 192 collect 410 for the monitored locations, i.e., the current location and any predicted locations, image data and sensor data that will be evaluated with respect to the respective environments and conditions in view of the respective tasks and activities to be performed. Accordingly, the preliminary operations 402 through 410 facilitate the compliance manager 152 defining the scope of monitoring at the monitored locations, i.e., which rules at which location should or need to be monitored.

Once the apparel compliance system 100 is ready to proceed through the process 400, the apparel donned by the respective individuals is captured 412 by the compliance manager 152. In at least one embodiment, cameras and sensors proximate the geofence capture 414 image data and sensor data of the donned apparel that will be evaluated as discussed further herein. In at least some embodiments, image data associated with the donned apparel by an individual may be captured 416 prior to arrival at the monitored locations. In one embodiment, for capturing 416 the donned apparel prior to arrival, the individual may register at their discretion to use camera devices among the IoT devices 192, including, and without limitation, smart watches, residential cameras, automotive cameras, and mobile phone cameras to attempt to capture images of the donned apparel prior to leaving their place of residence (or apartment for travelers). In some of these embodiments, the apparel compliance system 100 may alert the individual with respect to apparel compliance issues prior to arriving at the monitored location. In one or more embodiments, the image data of the donned apparel is captured 418 in one or more of the visible light spectrum and the infrared light spectrum. The visible light spectrum facilitates determining plain-sight compliance and non-compliance. The infrared light spectrum facilitates capturing items and issues not readily discernable in visible light, for example, and without limitation, the presence of heat-generating items disallowed within the confines of the geofence, if the individual is running an elevated temperature (an indication of illness), and determining if the clothing articles are cotton or wool, pure polyester, or a cotton/wool-polyester blend (due to the different flammability/burn characteristics). In one embodiment, the sensor data includes, without limitation, data from one or more of an x-ray scanner (to capture any objects not allowed within the geofence), a metal scanner (to capture metallic objects not allowed within the geofence, e.g., jewelry, or determine apparel includes steel-toed boots), and an ultraviolet scanner (for foreign substances that may introduce contamination within the geofence). Accordingly, the apparel compliance system 100 as described herein is configured to integrate the methods and system used for control of access into monitored areas.

In one or more embodiments, regardless of the source of the image and sensor data, the collected data is transmitted 420 to the artificial intelligence (AI) platform 150 for analysis. Specifically, the compliance manager 152 receives the data and analyzes 422 the received data to identify 424 the donned apparel by the individual. As discussed elsewhere herein, the compliance manager 152 is trained to recognize and distinguish articles of apparel. Once the apparel articles are recognized by the compliance manager 152, the compliance manager 152 compares the recognized articles of donned apparel to the contents of the knowledge base 170, including the required/suggested apparel database 174 that lists the respective clothing articles and accessory articles. In addition, in some embodiments, the requirements of apparel may differ by individuals because of physical biometrics (e.g., temperature, height, and weight) or individuals with known physical accommodation requirements or boundaries which may drive adherence to different safety standards. In at least some embodiments, the compliance manager 152 also compares the recognized apparel articles donned by the individual with the data in the individuals' apparel database 177. Accordingly, the apparel compliance system 100 as described herein is configured to operate seamlessly with apparel regardless of the source of the apparel.

In at least one embodiment, the granularity of the capture operations 412 (operations 414 through 420 inclusive), the analyzing operation 422, the identification operation 424, and the comparison operation 426 is configured for determining macro-level donned apparel characteristics, such as, and without limitation, short-sleeved shirts versus long-sleeved shirts without establishing the material composition of the shirts, and that a bracelet or necklace is being worn without establishing the material composition of the jewelry. However, if the level of granularity required includes the material composition of the donned apparel, such micro-level processes are available. For example, in some embodiments, the neural network is trained to distinguish articles of apparel based on, without limitation, type, shape, size, length, color, opaqueness, and material composition. Also, in some embodiments, the micro-level components can be stored in the apparel databases 174 and 177 with metadata associating the data content with an RFID tag.

Based on the comparison operation 426, the compliance manager 152 determines 428 the instances of apparel compliance and non-compliance. The compliance determination operation 428 is based fundamentally on the cognitive analysis of the AI platform 150 in determining the articles of apparel that are required to meet governmental standards and regulations, corporate standards, best practices based on industry guidance, etc., as stored in the library 172. Accordingly, an individual may proceed through the portal through the geofence if that individual is in possession of, or wearing the necessary protective apparel for the environment, conditions, tasks, and activities scheduled. If the individual is not wearing or in possession of the needed PPE, the apparel compliance system 100 informs them what they should be taking from the available clothing or equipment inventory available to them, and, as discussed further herein, determine the risk factors based on the data stored in the library 172, including previous accidents traced to non-compliance.

In one or more embodiments, the compliance manager 152 also determines 428 instances of non-compliance that are based on articles of apparel that are donned that should be removed prior to the individual proceeding through the geofence. For example, without limitation, an electrical technician will obtain a non-compliance if the working environment includes constricted space within an electrical enclosure, the conditions include energized electrical components, the tasks and activities include collecting voltage and current data within the enclosure, and the electrical technician is wearing metallic jewelry such as rings under gloves and a neck chain under coveralls, both that may be missed without the more thorough inspection prior to entry. Also, in some embodiments, the inclusion of jewelry in this example may be prevented prior to the electrical technician leaving the respective residence. Another example includes an environmental worker wearing a long-sleeved flannel shirt, where that environmental worked is scheduled to work in a high-temperature environment, thereby obtaining a non-compliance notification. In some embodiments, the compliance manager 152 is further trained with RFID data to further facilitate the compliance/non-compliance determination 428.

The instances of compliance and non-compliance are stored 430 within the knowledge base 170. In some embodiments, only non-compliance instances are stored within the variances database 178. In some embodiments, the instance of compliance and non-compliance are communicated 432, as discussed further herein.

Figure 5:
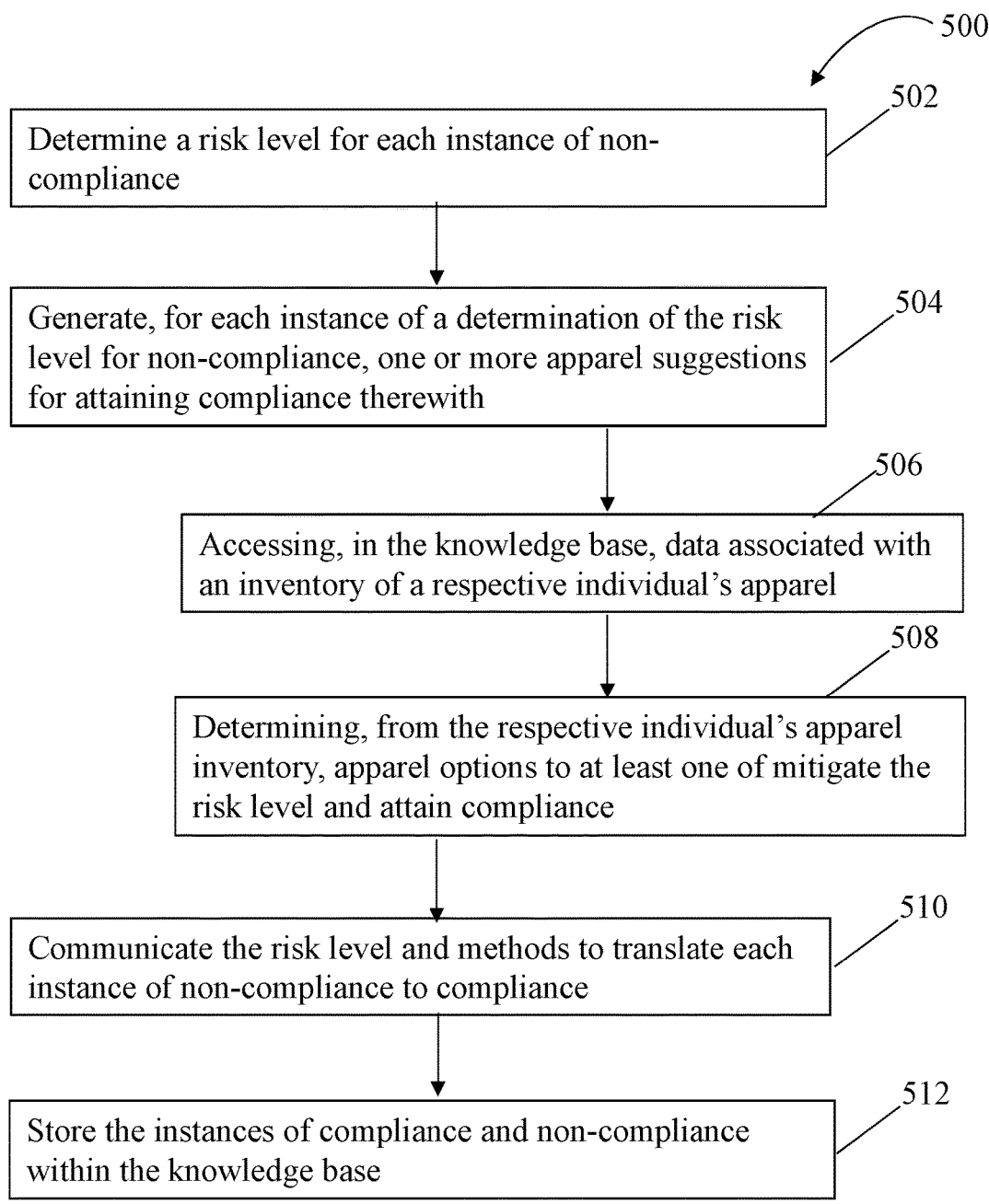
FIG. 5 is a flow chart illustrating a process for determining a risk level for each instance of non-compliance, in accordance with some embodiments of the present disclosure.

Referring to FIG. 5, a flow chart is provided illustrating a process 500 for determining 502 a risk level for each instance of non-compliance. The risk manager 156 calculates the risk based on one or more of real-time conditions and data stored in the knowledge base 170 as per the risk determination operation 342 discussed with respect to FIG. 3. As previously discussed, the instances of non-compliance and the associated risks are determined at the portal through the geofence prior to the individuals entering the monitored area. Therefore, the associated risks for the instances of non-compliance are also determined at this point. The purposes of determining the risk factors includes disseminating potential non-compliance data to the individuals in a manner that facilitates informed decision-making by the individuals to mitigate one risk factor to acceptable levels without elevating another risk factor to unacceptable levels. In addition, determining risk levels facilitates generating auditable records for an entity to demonstrate their adherence to the established safety standards. In some embodiments, the individual remains anonymous to protect the individual's privacy while still collecting data to track compliance. The auditable data may be maintained within the variances database 178.

The process 500 includes generating 504, for each instance of the determination operation 502 of the risk level for non-compliance, one or more apparel suggestions for attaining compliance therewith. In at least some embodiments, the compliance manager 152 determines if additional items are needed to meet safety apparel standards and/or determines if items need to be removed to meet safety apparel standards. The risk manager 156 determines if the risks with any non-compliances are associated with suggestions or laws and further determines a frequency of incidents based on historical tracking of individuals under similar circumstances. The risk manager 156 also users a mechanism, such as, without limitation, a risk engine (not shown) to determine the risks based on historical accident rates.

In at least some embodiments, the generating operation 504 includes accessing 506, in the knowledge base 170, data associated with an inventory of a respective individual's apparel and determining 508, from the respective individual's apparel inventory, apparel options to at least one of mitigate the risk level and attain compliance. The apparel inventory includes, without limitation, the contents of the individuals' apparel database 177, the required/suggested apparel database 174, and any other apparel database for the associated entity. In at least some embodiments, the required/suggested apparel database 174 is enhanced with personalized rules (e.g., allergy to latex) which may require additional monitoring for an individual and explain the reason for non-compliance in the auditable record.

In at least some embodiments, residential use is provided under voluntary opt-in by the individual. All other monitoring would meet local regulations regarding privacy as it relates to a person being monitored in a business-environment they choose to enter. IoT devices 192 that include a variety of available cameras may be used to facilitate compliance at the point of departure for the individual, for the convenience of the individual to understand future changes required prior to leaving their current location, whether such point be a residence or a business-provided environment, for example, and without limitation, a changing area. In general, the mechanisms for observing compliance are location agnostic, i.e., the location and the ownership of the monitoring devices are not technically relevant to achieving the goal of compliance other than the details of how such devices can be integrated into the apparel compliance system 100.

The process 500 further includes communicating 510 the risk level and methods to translate each instance of non-compliance to compliance. The compliance manager 152 proactively notifies an individual of the risk level determined by the risk manager 156. The communications will identify the risk level and the risk factors involved in determining the risk level. Risks are identified based on if the rule is mandated or suggested while a second metric determines the risk based on historical incidents given the environmental conditions and the particular level of non-compliance. In at least some embodiments, the risk level may be provided to the individual as a numerical value within an established and known range of values representative of the risk level such that the individual is unambiguously warned of the risk. In at least some alternative embodiments, the risk level is communicated on a non-numerical scale to again provide the individual with unambiguous notification. The device for communication the risk levels to the individual includes any of communication devices 180-192 through the computer network connection 105.

In at least some embodiments, the process 500 includes storing 512 the instances of compliance and non-compliance within the knowledge base 170. Specifically, the compliant and non-compliant instances are stored in a blockchain within the variance database 178. The blockchain shows a "pattern of compliance" (i.e., behavior) and also allows for explanations (e.g., allergy to latex) to demonstrate compliance to the appropriate auditing agency.

In one or more embodiments, a non-limiting example includes an electrical technician that works for an electric power transmission company and has been dispatched to a substation that includes voltages in excess of 12,000 volts (12 kV), including up to 345 kV, thereby defining the environment and conditions. The technician's tasking includes determining a potential instrumentation malfunction, and the activities include measuring inputs and outputs of the respective instrumentation with live voltages applied thereon, albeit, the voltages likely stepped down from the line voltages. In at least one embodiment of this example, the established geofence is substantially coincident with a physical fence surrounding the substation property and the portal through the geofence is a vehicle entry gate to the property. At the portal, the apparel compliance system 100 inspects the technician as described herein and detects that the technician is wearing a watch that was inadvertently not removed prior to approaching the portal. The standards database 173 includes a requirement for metallic equipment be removed for the aforementioned circumstances, as well as corporate requirements, industrial guidance, and known accident reports maintained within the knowledge base 170 and used to train the neural network within the AI platform 150. Moreover, the required/suggested apparel database 174, populated at least partially through the standards database 173, also includes such information coincident with the government standards. In addition, apparel compliance system 100 determines that the technician is wearing a polyester shirt which is also prohibited in such areas. In one embodiment, the apparel deficiencies will be determined at the portal. For those embodiments where there is no portal, but the technician was observed at either home or the dispatch point, as soon as the technician crosses within a predefined range, e.g., and without limitation, approximately 50 feet of the equipment in question, an alarm goes off on a device proximate the technician and the technician is instructed to remove his watch with a calculated risk level that exceeds any reasonable threshold value. With respect to the polyester shirt, the apparel compliance system 100 will provide similar notifications with a suggestion to remove the polyester shirt, or alternatively, take the appropriate actions to eliminate the hazard associated with such materials as required by OSHA. In those embodiments, where rather than removing this shirt, the technician takes actions to eliminate the risk, the calculated risk level should decrease to acceptable levels. The technician will record compliance with the instructed corrective actions such that the original non-compliance and performance of the subsequent corrections are both stored in the blockchain for any future compliance audits.

Another non-limiting example is directed toward a lifeguard that is employed to monitor a portion of a beach. As discussed herein, the historical accidents/incidents database 176 includes reports of a number of individuals receiving cuts on their feet, apparently due to broken seashells. The required/suggested apparel database 174 includes the use of appropriate footwear, e.g., and without limitation, rubber water shoes, to mitigate the risk of foot injury. Therefore, the compliance manager 152 will proactively suggest to the lifeguard that rubber water shoes be worn on the beach. In the event that the lifeguard decides to work without the shoes, the lack of abiding by the suggested actions to mitigate the risk level will result in the failure to heed the suggestion by the apparel compliance system 100 to be recorded in the variance database 178 in the blockchain to indicate the lifeguard has accepted the risk and the entity and/or the associated liability insurance provider is not liable for any medical expenses attributable to the lack of the footwear.

A further non-limiting example includes an individual working in a medical office where the employer requires the employees wear only long-sleeved shirts. As the individual is leaving the residence toward work in the morning, the apparel compliance system 100 informs the individual that she is either appropriately dressed, or she receives an alert if she is not. However, since the apparel compliance system 100 has the individual's schedule, the system 100 knows the days the employee has off from work and the monitoring is disabled such that the employee's attire is not recorded.

Figure 6:
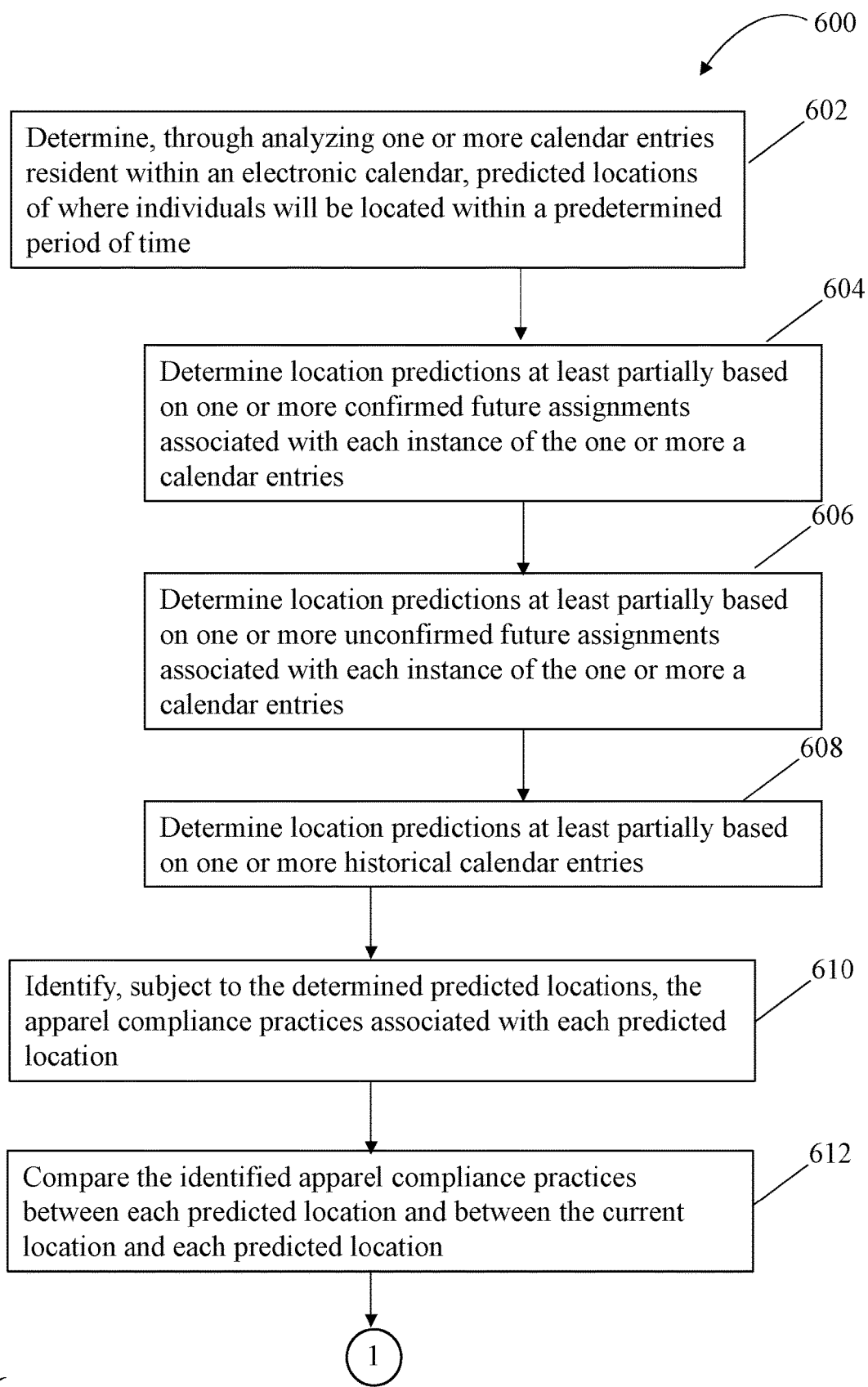
FIG. 6 is a flow chart illustrating a process for determining variances between a present location and future locations and a potential for non-compliances as a result thereof, in accordance with some embodiments of the present disclosure.
Figure 6:
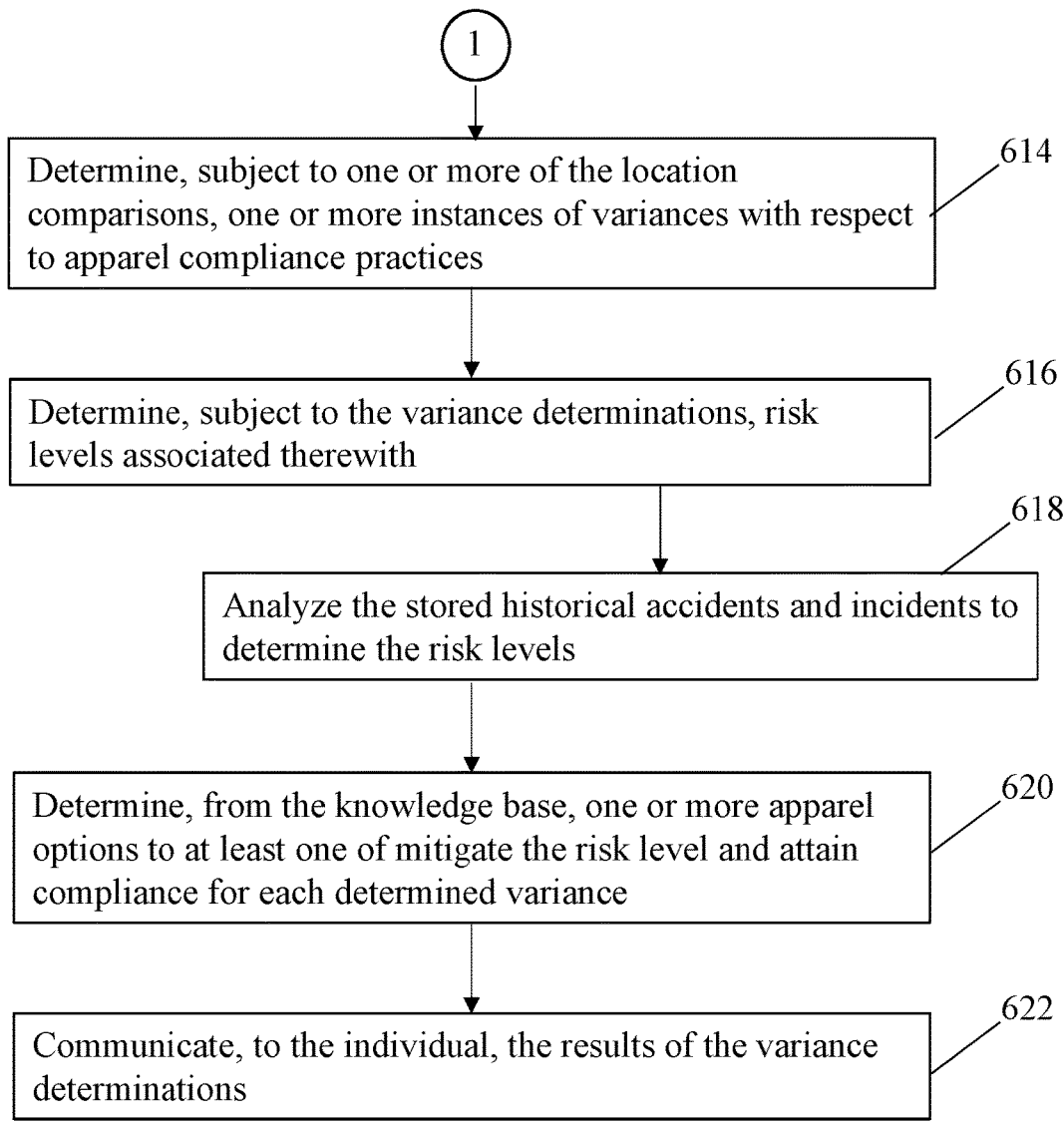

Referring to FIG. 6, a flow chart is provided illustrating a process 600 for determining variances between a present location and future locations and a potential for non-compliances as a result thereof. In at least one embodiment, the process 600 includes determining 602, by the compliance manager 152, through analyzing one or more calendar entries resident within an electronic calendar, the predicted locations individuals will be located within a predetermined period of time. In one or more alternative embodiments, the analysis of the calendar entries will be executed by, for example, and without limitation, an additional manager within the AI platform 150 or a stand-alone scheduling module within the server 110. In yet other embodiments, the calendar is used to determine the length of time an individual will be engaged in an activity at a monitored location, where the temporal quantifications impact the risk generated by the risk engine. For example, and without limitation, the amount of time an individual is going to spend loading items into a freezer could impact the need for protective gloves. In general, the predetermined period of time will be limited to accommodate the tendency for scheduled events to be further subject to change the farther into the future they are scheduled as compared to nearer-term events. In addition, in some embodiments, the nature of the scheduled assignments will be used by the compliance manager 152 since, as discussed further herein, the determination of the proper apparel for a single assignment for a week will likely have a substantially uniform set of requirements for the entire week. In contrast, for a trip from the United States to multiple countries in Europe and Asia over a one-month period, it would be unlikely that a single set of common apparel requirements will be identified.

In one or more embodiments, the determining operation 602 includes determining 604 the location predictions for at least one individual at least partially based on one or more confirmed future assignments associated with each instance of the calendar entries. The determining operation 602 further includes determining 606 location predictions for the individual at least partially based on one or more unconfirmed future assignments associated with each instance of the calendar entries. Accordingly, in at least some embodiments, the compliance manager 152 discriminates between confirmed assignments and unconfirmed assignments.

In addition, in at least one embodiment, the determining operation 602 includes determining 608 the location predictions at least partially based on one or more historical calendar entries. In such embodiments, the compliance manager 152 is trained to determine patterns in the schedule of an individual to accurately predict the individual's upcoming task and activity assignments and the environment and conditions thereof.

Once the individual's calendar is analyzed 602, the compliance manager 152 identifies 610, subject to the determined predicted locations, the apparel compliance practices associated with each predicted location. The process 600 proceeds to comparing 612 the identified apparel compliance practices between each predicted location, and, in addition, the identified apparel compliance practices between the current location and each predicted location. Subject to the results of the comparison operation 612, one or more instances of variances with respect to apparel compliance practices are determined 614. In addition, subject to the variance determination operation 614, the compliance manager 152, in conjunction with the risk manager 156, determines 616 the risk associated with each variance through, in at least one embodiment, analyzing 618 the historical accidents and incidents data stored in the historical accidents and incidents database 176 to determine the risk levels for each variance. In at least some alternative embodiments, the risks are determined through any mechanism that enables operation of the apparel compliance system 100 as described herein. The process 600 proceeds to the compliance manager 152 determining 620, from the knowledge base 170, one or more apparel options to at least one of mitigate the risk level and attain compliance for each determined variance. Accordingly, prior to leaving one monitored location for other monitored location, a variance in the required and suggested apparel between the various locations is determined to facilitate preparing the individual to mitigate the risks associated with each of the monitored locations.

The compliance manager 152 uses the communications network connection 105 to communicate 622 to the respective individuals the results of the operations 610 through 620 via one or more of the communications devices 180 through 192. In at least one embodiment, the communications include, without limitation, the instances of the determined variances with respect to apparel compliance practices, the determined risk level associated with each variance, and the determined apparel options to at least one of mitigate the risk level and attain compliance for each determined variance. The communications between the compliance manager 152 and the individuals is maintained in the communications/notifications database 179. Accordingly, when an individual plans to travel between monitored locations, whether on the same site, or through international travel, the crossing of a physical boundary (as determined by a geofence) can be used to inform the individual of the associated variances of apparel requirements and suggestions necessary to maintain compliance.

In one illustrative example, and without limitation, an individual is a construction worker in Europe that has at least occasional travel between nations, and where the apparel rules vary from nation-to-nation. Therefore, in this example, the individual leverages the apparel compliance system 100 to communicate the required and suggested apparel for each nation based on the individual's calendar entries. As discussed herein, the apparel compliance system 100 is configured to provide an auditable trail of documentation with respect to compliance with, for example, and without limitation, governmental laws and insurance company requirements. Therefore, the individual's apparel recommendations are recorded and stored in the communications/notifications database. Also, similarly stored is each instance of the individual, at each of the monitored locations, generating a compliance record, or a non-compliance record with the associated record of remedial action to eliminate the non-compliance, or at least mitigate the associated risk. The use of blockchain to record the compliance data facilitates providing immutable records on demand for any auditing agency.

Accordingly, the integration of the features of the compliance manager 152, the NLP manager 154, the risk manager 156, and the knowledge base 170 results in a practical application of an improvement to the arts directed toward apparel compliance.

Figure 7:
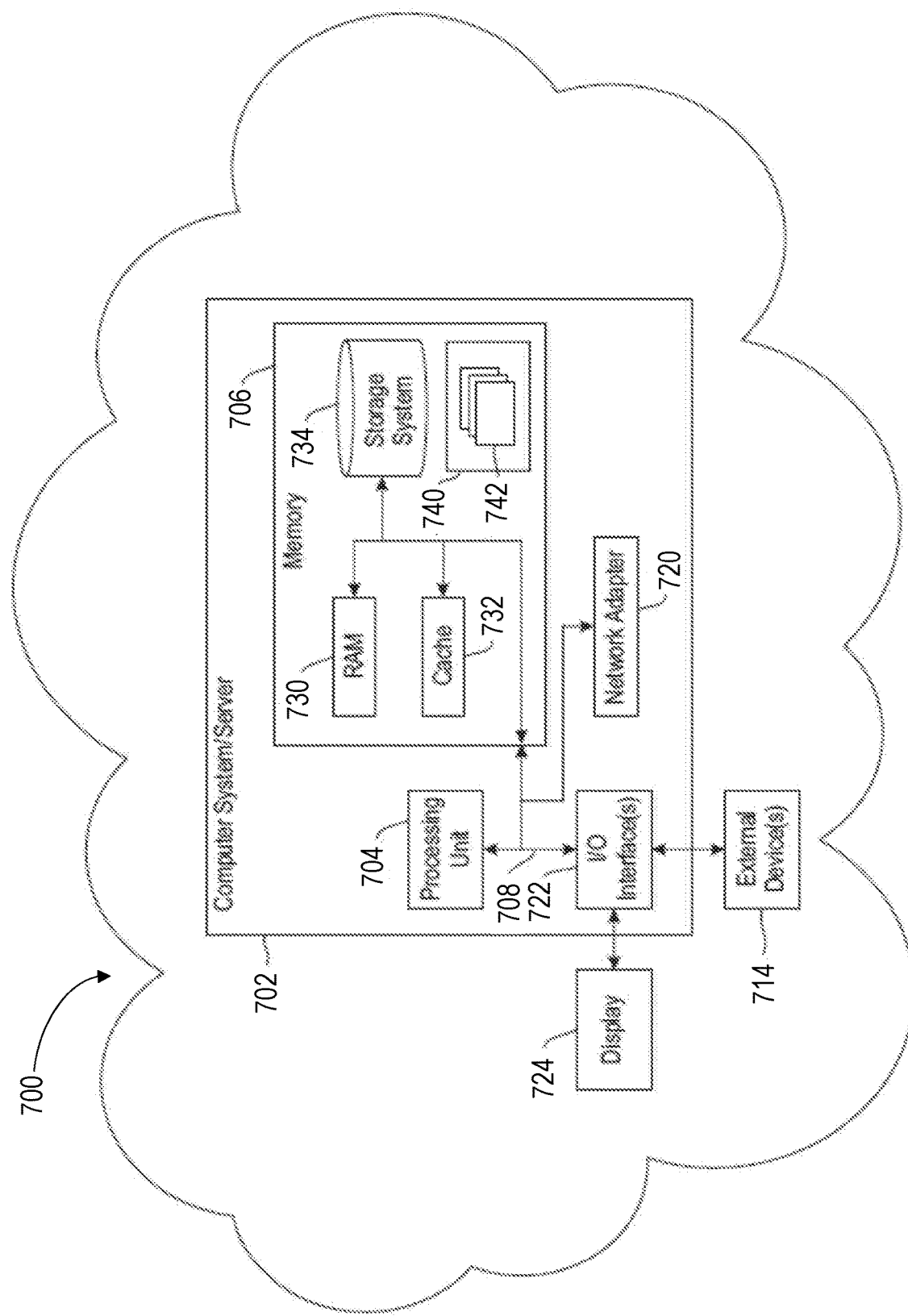
FIG. 7 is a block diagram illustrating a computer system/server of a cloud-based support system, to implement the processes described above with respect to FIGS. 1-6, in accordance with some embodiments of the present disclosure.

Aspects of the computer system 100 may be embodied in a computer system/server in a single location, or in at least one embodiment, may be configured in a cloud-based system sharing computing resources. With reference to FIG. 7, a block diagram is provided illustrating an example of a computer system 700 including a computer/server 702, hereinafter referred to as a host 702 in communication with a cloud-based support system, to implement the system, tools, and processes described above with respect to FIGS. 1-6. Host 702 is operational with numerous other general purpose or special purpose computer system environments or configurations. Examples of well-known computer systems, environments, and/or configurations that may be suitable for use with host 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 702 may be described in the general context of computer system-executable instructions, such as program modules, being executed by a computer system. Generally, program modules may include routines, programs, objects, components, logic, data structures, and so on that perform particular tasks or implement particular abstract data types. Host 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, host 702 is shown in the form of a general-purpose computing device. The components of host 702 may include, but are not limited to, one or more processors or processing devices or units 704, e.g. hardware processors, a system memory 706, and a bus 708 that couples various system components including system memory 706 to processing device 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 702 typically includes a variety of computer system readable media. Such media may be any available media that is accessible by host 702 and it includes both volatile and non-volatile media, removable and non-removable media.

Memory 706 can include computer system readable media in the form of volatile memory, such as random access memory (RAM) 730 and/or cache memory 732. By way of example only, a storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces.

Program/utility 740, having a set (at least one) of program modules 742, may be stored in memory 706 by way of example, and not limitation, as well as an operating system, one or more application programs, other program modules, and program data. Each of the operating systems, one or more application programs, other program modules, and program data or some combination thereof, may include an implementation of a networking environment. Program modules 742 generally carry out the functions and/or methodologies of embodiments as described in FIGS. 1-6.

Host 702 may also communicate with one or more external devices 714, such as a keyboard, a pointing device, etc.; a display 724; one or more devices that enable a user to interact with host 702; and/or any devices (e.g., network card, modem, etc.) that enable host 702 to communicate with one or more other computing devices. Such communication can occur via Input/Output (I/O) interface(s) 722. Still yet, host 702 can communicate with one or more networks such as a local area network (LAN), a general wide area network (WAN), and/or a public network (e.g., the Internet) via network adapter 720. As depicted, network adapter 720 communicates with the other components of host 702 via bus 708. In at least one embodiment, a plurality of nodes of a distributed file system (not shown) is in communication with the host 702 via the I/O interface 722 or via the network adapter 720. It should be understood that although not shown, other hardware and/or software components could be used in conjunction with host 702. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 706, including RAM 730, cache memory 732, and storage system 734, such as a removable storage drive and a hard disk installed in a hard disk drive.

Computer programs (also called computer control logic) are stored in memory 706. Computer programs may also be received via a communication interface, such as network adapter 720. Such computer programs, when run, enable the computer system to perform the features of the present embodiments as discussed herein. In particular, the computer programs, when run, enable the processing device 704 to perform the features of the computer system 700. As such, computer programs may represent controllers of the computer system 700.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In at least one embodiment, host 702 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a state of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
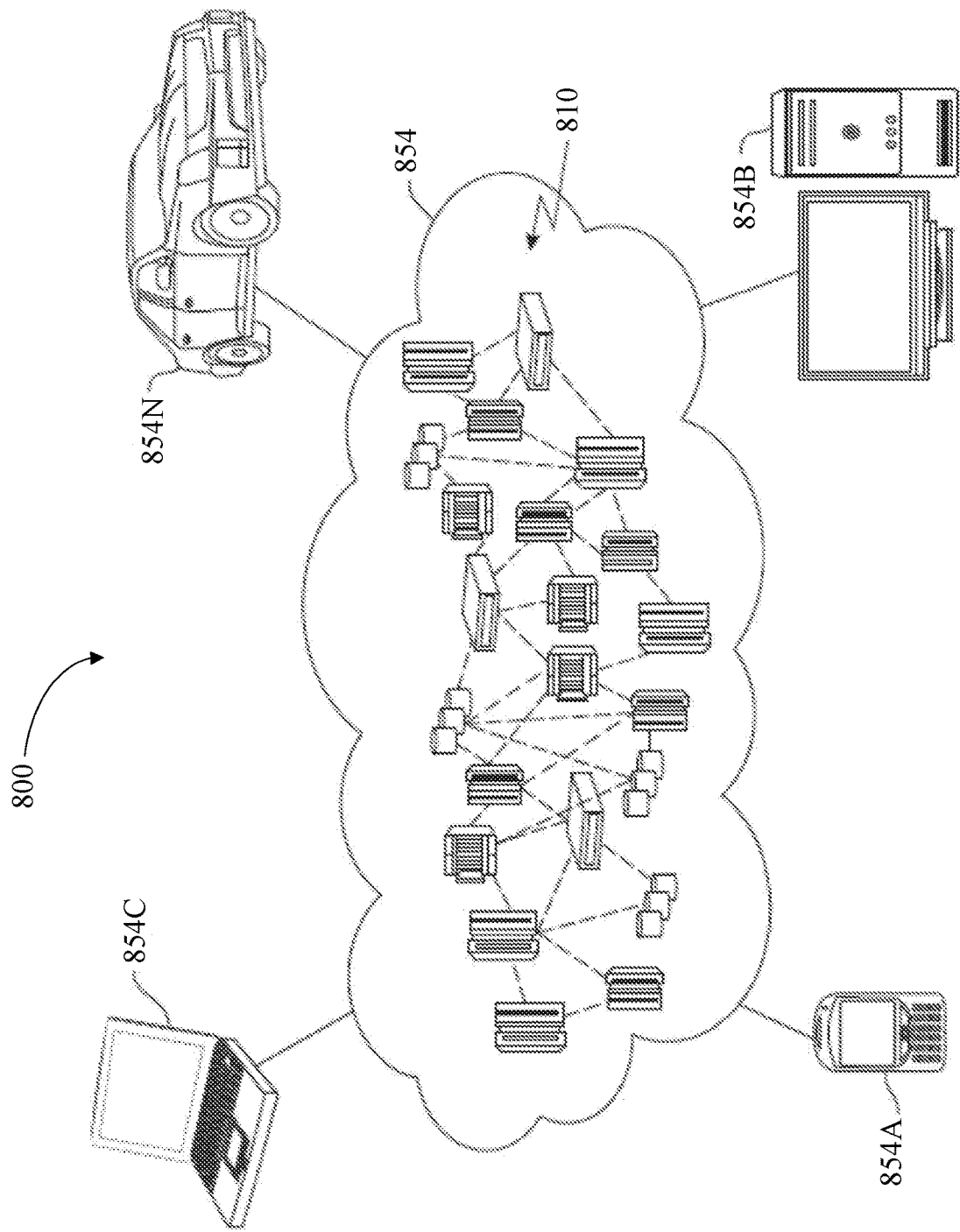
FIG. 8 is a schematic diagram illustrating a cloud computer environment, in accordance with some embodiments of the present disclosure.

Referring now to FIG. 8, a schematic diagram is provided illustrating an example cloud computing network 800. As shown, cloud computing network 800 includes a cloud computing environment 850 having one or more cloud computing nodes 810 with which local computing devices used by cloud consumers may communicate. Examples of these local computing devices include, but are not limited to, personal digital assistant (PDA) or cellular telephone 854A, desktop computer 854B, laptop computer 854C, and/or automobile computer system 854N. Individual nodes within nodes 810 may further communicate with one another. They may be grouped (not shown) physically or virtually, in one or more networks, such as Private, Community, Public, or Hybrid clouds as described hereinabove, or a combination thereof. This allows the cloud computing network 800 to offer infrastructure, platforms and/or software as services for which a cloud consumer does not need to maintain resources on a local computing device. It is understood that the types of computing devices 854A-N shown in FIG. 8 are intended to be illustrative only and that the cloud computing environment 850 can communicate with any type of computerized device over any type of network and/or network addressable connection (e.g., using a web browser).

Figure 9:
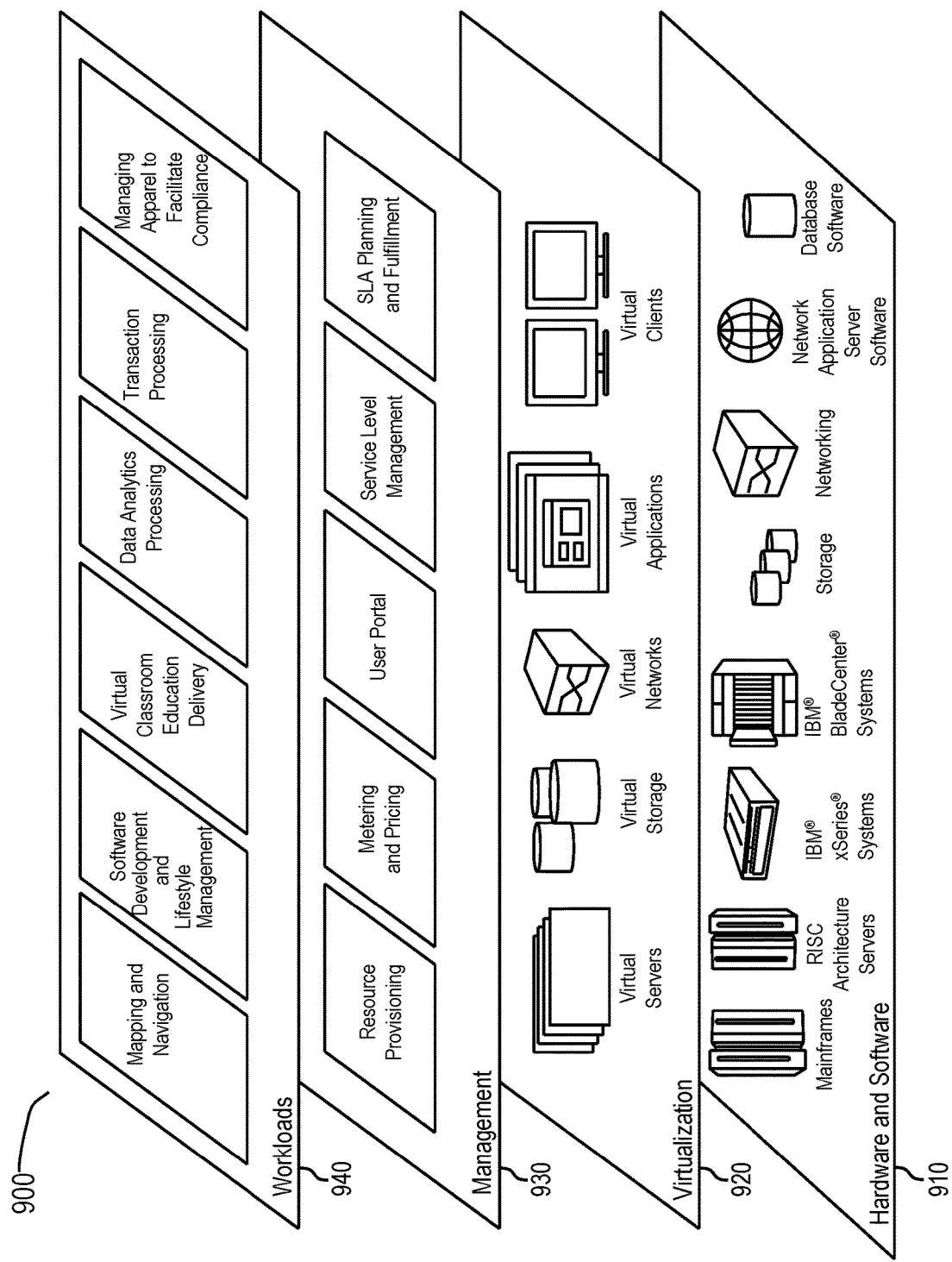
FIG. 9 is a block diagram illustrating a set of functional abstraction model layers provided by the cloud computing environment, in accordance with some embodiments of the present disclosure.

Referring now to FIG. 9, a set of functional abstraction layers 900 provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer 910, virtualization layer 920, management layer 930, and workload layer 940.

The hardware and software layer 910 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 920 provides an abstraction layer from which the following examples of virtual entities may be provided: virtual servers; virtual storage; virtual networks, including virtual private networks; virtual applications and operating systems; and virtual clients.

In one example, management layer 930 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 940 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and managing apparel to facilitate compliance, and, more specifically, for leveraging an artificial intelligence platform to dynamically analyze the apparel donned by an individual to determine compliance with established apparel compliance practices and provide suggestions for overcoming non-compliance.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
a server comprising at least one processing device and at least one memory device operably coupled to the at least one processing device, the server in operable communication with a plurality of external computing devices, the server configured to provide access control into a monitored area comprising:
  capture, through one or more external computing devices, apparel donned prior to a crossing of a physical perimeter into the monitored area;
  compare captured apparel donned with data in a knowledge base;
  determine, subject to the comparison, instances of compliance and non-compliance, including items of apparel to be removed prior to the crossing of the physical perimeter;
  determine, for each instance of non-compliance, a risk level associated therewith;
  communicate, to the one or more external computing devices of the plurality of external computing devices:
    a non-compliance alert notification:
    the determined risk level, and
    methods to translate each instance of non-compliance to compliance; and
  store the instances of compliance and non-compliance within the knowledge base.

2. The system of claim 1, wherein the computer system is a cognitive system.

3. The system of claim 2, further comprising:
an artificial intelligence (AI) platform resident within the server, the AI platform in operable communication with the knowledge base, the AI platform comprising:
  a compliance manager configured to facilitate execution of one or more operations by the server comprising one or more of:
    the generation of the knowledge base;
    the comparison of the captured apparel donned with the data in the knowledge base;
    the determination of the instances of compliance and non-compliance;
    the determination of the risk level associated with each instance of non-compliance; and
    the storage of the instances of compliance and non-compliance within the knowledge base.

4. The system of claim 3, wherein:
the plurality of external computing devices comprises one or more cameras and one or more scanners positioned proximate a geofence;
at least one of the one or more scanners includes one or more of x-ray, metal, and ultraviolet configurations; and
each camera and scanner of the one or more cameras and one or more scanners is communicatively coupled to the compliance manager and configured to transmit captured data thereto.

5. The system of claim 4, wherein the compliance manager is further configured to:
analyze the data transmitted from the one or more cameras and one or more scanners to capture and identify the donned apparel, wherein the donned apparel includes one or more of clothing articles and accessory articles.

6. The system of claim 3, wherein the AI platform further comprises:
a natural language processing (NLP) manager communicatively coupled to the compliance manager and the knowledge base, the NLP manager configured to facilitate the capture of apparel compliance practices.

7. The system of claim 3, wherein the AI platform further comprises:
a risk manager communicatively coupled to the compliance manager and the knowledge base, the risk manager configured to facilitate the determination of the risk level associated with each instance of non-compliance through analysis of historical incidents.

8. A computer program product to manage apparel through dynamic analysis of apparel donned by an individual to determine compliance with established apparel compliance practices and provide suggestions for overcoming non-compliance, the computer program product comprising:
one or more computer readable storage media; and
program instructions collectively stored on the one or more computer storage media, the program instructions comprising:
  program instructions to capture, through one or more computing devices, apparel compliance practices related to one or more of:
    practices directed toward inclusion and exclusion of one or more items of apparel during one or more activities; and
    historical incidents related to the one or more items of apparel during the one or more activities;
  program instructions to generate a knowledge base including data associated with managing apparel for one or more of jurisdictional compliance and extra-jurisdictional compliance at least partially based on the apparel compliance practices;
  program instructions to provide access control into a monitored area comprising:
    program instructions to capture, through the one or more computing devices, apparel donned prior to a crossing of a physical perimeter into the monitored area;
    program instructions to compare captured apparel donned with the data in the knowledge base;
    program instructions to determine, subject to the comparison, instances of compliance and non-compliance, including items of apparel to be removed prior to the crossing of the physical perimeter;
    program instructions to determine, for each instance of non-compliance, a risk level associated therewith;
    program instructions to communicate, to the one or more computing devices:
      a non-compliance alert notification;
      the determined risk level; and
      methods to translate each instance of non-compliance to compliance; and
    program instructions to store the instances of compliance and non-compliance within the knowledge base.

9. The computer program product of claim 8, further comprising program instructions to:
ingest and analyze one or more of:
  rules, regulations, standards, procedures, instructions, codes, and guidelines promulgated by one or more government agencies, wherein the one or more government agencies are one or more of jurisdictional and extra-jurisdictional;
  standards, guidelines, suggestions, protocols, conventions, and customs promulgated for one or more private sector industries through one or more respective industrial associations;
  rules, standards, procedures, guidelines, suggestions, protocols, conventions, and customs promulgated by one or more private sector entities, wherein the one or more private sector entities are one of corporate and non-corporate; and historical incident reports and apparel problem reports; and use natural language processing (NLP) to facilitate the capture of the apparel compliance practices.

10. The computer program product of claim 8, further comprising program instructions to:

generate, for each instance of a determination of the risk level for non-compliance, one or more apparel suggestions for attaining compliance therewith, further comprising program instructions to:

access, in the knowledge base, data associated with an inventory of a respective individual's apparel; and determine, from the respective individual's apparel inventory, apparel options to at least one of mitigate the risk level and attain compliance.

11. The computer program product of claim 8, further comprising program instructions to:

determine, through analyzing one or more calendar entries resident within an electronic calendar, predicted locations where one or more individuals will be located within a predetermined period of time;

identify, subject to the determined predicted locations, the apparel compliance practices associated with each predicted location;

compare the identified apparel compliance practices between each predicted location and between a current location and each predicted location;

determining, subject to one or more of the location comparisons, one or more instances of variances with respect to apparel compliance practices;

determine subject to the variance determinations, a risk level associated therewith; and determine, from the knowledge base, one or more apparel options to at least one of mitigate the risk level and attain compliance for each determined variance.

12. A computer-implemented method for comprising:

providing access control into a monitored area comprising capturing, through one or more computing devices, apparel donned prior to a crossing of a physical perimeter into the monitored area;

comparing the captured apparel donned with data in a knowledge base including apparel compliance practices directed toward inclusion and exclusion of one or more items of apparel for crossing the physical perimeter into the monitored area;

determining, subject to the comparison, instances of compliance and non-compliance, including items of apparel to be removed prior to the crossing of the physical perimeter;

determining, for each instance of non-compliance, a risk level associated therewith;

communicating, to the one or more computing devices:

a non-compliance alert notification:

the determined risk level: and methods to translate each instance of non-compliance to compliance; and storing the instances of compliance and non-compliance within the knowledge base.

13. The method of claim 12, further comprising:

generating, for each instance of a determination of the risk level for non-compliance, one or more apparel suggestions for attaining compliance therewith.

14. The method of claim 13, wherein generating one or more apparel suggestions for attaining compliance comprises:

accessing, in the knowledge base, data associated with an inventory of a respective individual's apparel; and determining, from the respective individual's apparel inventory, apparel options to at least one of mitigate the risk level and attain compliance.

15. The method of claim 12, further comprising:

determining, through analyzing one or more calendar entries resident within an electronic calendar, predicted locations where one or more individuals will be located within a predetermined period of time;

identifying, subject to the determined predicted locations, the apparel compliance practices associated with each predicted location;

comparing the identified apparel compliance practices between each predicted location and between a current location and each predicted location;

determining, subject to one or more of the location comparisons, one or more instances of variances with respect to the apparel compliance practices;

determining, subject to the variance determinations, a risk level associated therewith; and determining, from the knowledge base, one or more apparel options to at least one of mitigate the risk level and attain compliance for each determined variance.

16. The method of claim 15, wherein determining the predicted locations comprises one or more of:

determining the location predictions at least partially based on one or more confirmed future assignments associated with each instance of the one or more calendar entries;

determining the location predictions at least partially based on one or more unconfirmed future assignments associated with each instance of the one or more a calendar entries; and determining location predictions at least partially based on one or more historical calendar entries.

17. The method of claim 15, further comprising one or more of:

analyzing the historical incidents to determine the risk levels; and communicating, to the one or more individuals, one or more of:

the one or more instances of the determined one or more variances with respect to the apparel compliance practices;

the determined risk level associated therewith; and the determined one or more apparel options to at least one of mitigate the risk level and attain the compliance for each determined variance.

18. The method of claim 12, wherein capturing apparel donned comprises:

capturing image data of the donned apparel in one or more of the visible light spectrum and the infrared light spectrum through cameras positioned proximate a geofence;

capturing data through one or more of an x-ray scanner, a metal scanner, and an ultraviolet scanner positioned proximate the geofence;

transmitting the captured data to an artificial intelligence (AI) platform for analysis thereof, analyzing, by the AI platform, the received captured data; and identifying the donned apparel, wherein the donned apparel includes one or more of clothing articles and accessory articles.

19. The method of claim 12, further comprising:
capturing, by one or more computing devices, apparel compliance practices related to one or more of:
   practices directed toward inclusion and exclusion of one or more items of apparel during one or more activities; and
   historical incidents related to the one or more items of apparel during the one or more activities; and
generating the knowledge base including data associated with managing apparel for one or more of jurisdictional compliance and extra-jurisdictional compliance at least partially based on the apparel compliance practices.

20. The method of claim 19, wherein capturing practices directed toward the inclusion and exclusion of one or more items of apparel during the one or more activities comprises:
ingesting and analyzing one or more of:
   rules, regulations, standards, procedures, instructions, codes, and guidelines promulgated by one or more government agencies, wherein the one or more government agencies are one or more of jurisdictional and extra-jurisdictional;
   standards, guidelines, suggestions, protocols, conventions, and customs promulgated for one or more private sector industries through one or more respective industrial associations;
   rules, standards, procedures, guidelines, suggestions, protocols, conventions, and customs promulgated by one or more private sector entities, wherein the one or more private sector entities are one of corporate and non-corporate; and historical incident reports and apparel problem reports; and
using natural language processing (NLP) to facilitate the capture of the apparel compliance practices.

* * * * *